United States Patent
Maeda et al.

(10) Patent No.: US 8,904,518 B2
(45) Date of Patent: Dec. 2, 2014

(54) INFORMATION PROCESSING DEVICE, INFORMATION PROCESSING METHOD, AND PROGRAM DISTRIBUTION SYSTEM

(75) Inventors: Manabu Maeda, Osaka (JP); Hideki Matsushima, Osaka (JP); Tomoyuki Haga, Nara (JP); Kenneth Alexander Nicolson, Hyogo (JP)

(73) Assignee: Panasonic Corporation, Osaka (JP)

( * ) Notice: Subject to any disclaimer, the term of this patent is extended or adjusted under 35 U.S.C. 154(b) by 443 days.

(21) Appl. No.: 13/382,327

(22) PCT Filed: Apr. 19, 2011

(86) PCT No.: PCT/JP2011/002281
§ 371 (c)(1),
(2), (4) Date: Jan. 5, 2012

(87) PCT Pub. No.: WO2011/138852
PCT Pub. Date: Nov. 10, 2011

(65) Prior Publication Data
US 2012/0117566 A1 May 10, 2012

(30) Foreign Application Priority Data
May 7, 2010 (JP) .................................. 2010-107717

(51) Int. Cl.
*G06F 21/00* (2013.01)
*G06F 21/53* (2013.01)
*G06F 21/55* (2013.01)
*G06F 9/455* (2006.01)

(52) U.S. Cl.
CPC .............. *G06F 21/53* (2013.01); *G06F 21/556* (2013.01); *G06F 9/45533* (2013.01)
USPC ................. 726/17; 718/1; 718/100; 718/101; 718/102; 713/165; 713/167

(58) Field of Classification Search
CPC .... G06F 21/53; G06F 9/45533; G06F 21/556
USPC .......................................................... 726/17
See application file for complete search history.

(56) References Cited

U.S. PATENT DOCUMENTS 6,662,230 B1 * 12/2003 Eichstaedt et al. ............ 709/229
8,505,029 B1 * 8/2013 Chanda et al. ................ 719/313
(Continued)

FOREIGN PATENT DOCUMENTS

GB 2463345 3/2010
JP 3607540 10/2004
(Continued)

OTHER PUBLICATIONS

Chen et al., "VP2P: A Virtual Machine-based P2P Testbed for VoD Delivery", Jan. 2009, Consumer Communications and Networking Conference, CCNC 2009, pp. 1-5.*
Extended European Search Report issued Jul. 4, 2013 in the corresponding European Application No. 11777373.9.
International Search Report issued Jul. 26, 2011 in corresponding International Application No. PCT/JP2011/002281.
(Continued)

*Primary Examiner* — Taghi Arani
*Assistant Examiner* — Kenneth Chang
(74) *Attorney, Agent, or Firm* — Wenderoth, Lind & Ponack, L.L.P.

(57) ABSTRACT

An information processing device includes an external connection unit which connects to an external device; and a communication control unit which obtains data from a first virtual machine, transmits the data to a second virtual machine, and transmits, to the external connection unit, transmission completion information indicating that the data is already transmitted to the second virtual machine. The external connection unit (i) determines, based on the transmission completion information, whether or not a virtual machine is the second virtual machine to which the data is already transmitted, when the external connection unit receives, from the virtual machine, a request for a connection to the external device, and (ii) permits a connection between the virtual machine and the external device, when the external connection unit determines that the virtual machine is not the second virtual machine to which the data is already transmitted.

15 Claims, 29 Drawing Sheets

(56) References Cited

U.S. PATENT DOCUMENTS

| | | |
|---|---|---|
| 2005/0172294 A1 | 8/2005 | Kanemura et al. |
| 2007/0245348 A1* | 10/2007 | Araujo et al. ............... 718/1 |
| 2008/0005441 A1* | 1/2008 | Droux et al. ............ 710/306 |
| 2008/0178176 A1* | 7/2008 | Berger et al. ............... 718/1 |
| 2009/0182928 A1* | 7/2009 | Becker et al. ............... 711/6 |
| 2009/0193173 A1* | 7/2009 | Joshi et al. ................. 711/6 |
| 2009/0293058 A1* | 11/2009 | Ahn et al. .................. 718/1 |
| 2009/0307705 A1 | 12/2009 | Bogner |
| 2009/0328225 A1* | 12/2009 | Chambers et al. .......... 726/26 |
| 2010/0070980 A1 | 3/2010 | Tanaka et al. |

FOREIGN PATENT DOCUMENTS

| | | |
|---|---|---|
| JP | 2005-11336 | 1/2005 |
| JP | 2010-72703 | 4/2010 |
| WO | 2009/025166 | 2/2009 |
| WO | 2009/147631 | 12/2009 |

OTHER PUBLICATIONS

Intel Corporation and NTT DoCoMo, Inc., "Open and Secure Terminal Initiative (OSTI) Architecture Specification Revision 1.00", Oct. 16, 2006, pp. 1-17.

* cited by examiner

FIG. 13

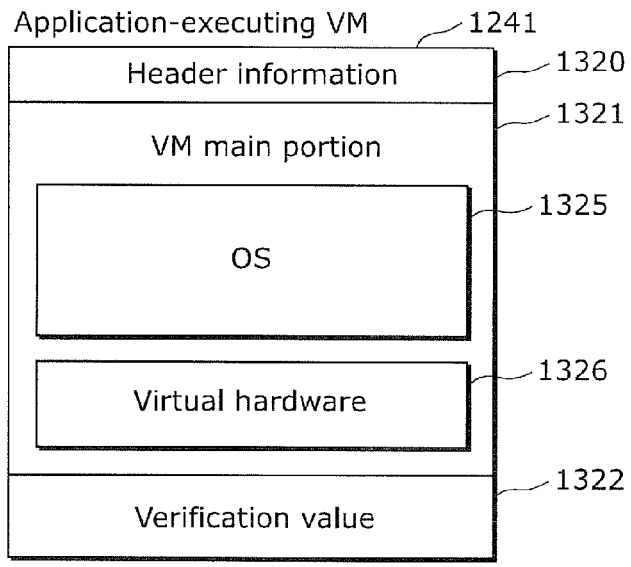

Application-executing VM — 1241
- Header information — 1320
- VM main portion — 1321
  - OS — 1325
  - Virtual hardware — 1326
- Verification value — 1322

FIG. 14

Virtual machine management table — 1350

| Virtual machine ID | Status | Memory | Destination for storing suspension state |
|---|---|---|---|
| 1 | Running | 0x52000 - 0x62000 | 0x1000 |
| .... | .... | .... | .... |
| n | Suspended | 0xA0000 - 0xB0000 | 0x10500 |

FIG. 15

Application management table — 1380

| Application ID | Virtual machine ID | Function to be used | | |
| | | Internet connection | Bluetooth | Infrared |
|---|---|---|---|---|
| 1 | 1 | Yes | No | No |
| 2 | 2 | No | Yes | No |

FIG. 16A

Permission type management table ∕1381

| Function | Address book | Picture | Email |
|---|---|---|---|
| Internet connection | No | No | No |
| Bluetooth | No | Yes | Yes |
| Infrared | Yes | Yes | Yes |

FIG. 16B

Permission type management table ∕1382

| Application ID | Address book | Picture | Email |
|---|---|---|---|
| DL application 1 | No | No | No |
| DL application 2 | Yes | No | No |
| DL application 3 | No | Yes | Yes |

FIG. 17A

Transmitted data type management table ∕1383

| Virtual machine ID | Type of transmitted data | | |
|---|---|---|---|
| | Address book | Picture | Email |
| 1 | — | Yes | — |
| 2 | — | — | Yes |

FIG. 17B

Connection permission/restriction
management table                    1384

| Virtual machine ID | Connection permission |
|---|---|
| 1 | No |
| 2 | Yes |

FIG. 17C

Limitation type list                1385

| Type of data | External connection |
|---|---|
| Address book | No |
| Picture | No |
| Email | Yes |
| ⋮ | ⋮ |

Parent and child relationship management table  1360

| Parent virtual machine ID | Child virtual machine ID |
|---|---|
| 1 | 3 |
| 1 | 4 |
| .... | .... |
| 2 | 5 |

INFORMATION PROCESSING DEVICE, INFORMATION PROCESSING METHOD, AND PROGRAM DISTRIBUTION SYSTEM

BACKGROUND OF INVENTION

1. Technical Field

The present invention relates to an information processing device, an information processing method, and a program distribution system which prevent unauthorized access to data.

2. Background Art

Conventional cellular phones allow users to download application software (hereafter referred to as "application") so as to add a new function after the purchase of the device (cellular phone), and use the application software. With such an application, access to various resources within the device is limited conventionally. Here, examples of the resources in the device include position information generated by, for example, GPS (Global Positioning System), and data generated by another application such as a dial function, an address book, a bookmark, and image data. However, in recent years, the access limitation has been eased to allow the development of a variety of applications, and devices which allow access to the position information and the data such as the dial function and the address book have become available. For instance, Android™ offered by Google Inc. allows applications downloaded from Android Market, an application distribution site, to access, for example, the address book, the bookmark, the GPS information, and a network function.

In the future, it is considered that devices which allow the users to install device driver software (hereafter referred to as "device driver") so as to add new hardware would become available.

Moreover, only specific application development companies conventionally develop and distribute the applications. However, in recent years, a system is being developed in which general users can develop and distribute applications. In such a system, in order for the general users to easily develop applications, development tools generally used in a personal computer (hereafter referred to as "PC") are available for the development of applications, and debuggers can be connected to devices for sale.

At the same time, the leakage of data such as personal information (name, address, telephone number, email address, credit card number, and so on) or personal content (picture, video, email, and position information) has become a problem. Especially in the PC, malicious software which is downloaded from an open network such as the Internet reads the data such as the personal information and personal content stored in a storage device of the PC, and transmits the data to outside of the PC via the network despite a user's intention, which causes the leak of the data. Moreover, the malicious software causes a user (him or her) to download the malicious software by making, with, for example, the use of an email, the user believe that the malicious software itself is a useful software for the user, or by exploiting the vulnerability of software which operates on the PC.

In particular, a device driver can access data deployed by an application on a memory. For this reason, a device driver in a device to which the device driver can be installed accesses data that is not desirable to be disclosed to another application such as the personal information, and thus the device has a high risk of the leakage.

In such a manner, the downloaded application (hereafter referred to as "DL application") and the downloaded device driver (hereafter referred to as "DL device driver") can access many resources in the PC and the cellular phone. Moreover, it is considered that the general users can develop and distribute the applications, and further would be able to develop and distribute device drivers in the future. As a result, malicious attackers can develop and install attack applications (hereafter referred to as "malicious applications") and attack device drivers (hereafter referred to as "malicious device drivers"). This situation enables the malicious application and the malicious device driver to access information in the device, which increases the danger of the leakage and tampering of information.

Moreover, the malicious application or the malicious device driver can not only actively access the information in the device but also leak the information in the device by obtaining the information using dynamic data link with other applications. For instance, Android offered by Google Inc. has a function to request another application to process data, which is called "Intent". An origin of the request for the processing calls this function with parameters which are the processing to be requested, data to be processed, and a type of the data. A system which has been requested to perform the processing selects, for the type of the data specified by the parameter, an application which can perform the processing also specified by the parameter. Here, when there are selectable applications, the system presents a list of the applications to the user, and allows the user to select one of the applications. Then, the system starts the selected application, and requests the started application to process the data. Here, it is assumed that a malicious application developed by a malicious attacker declares to the system that every processing can be performed for all the types of data. Then, the malicious application can obtain all the data exchanged using the dynamic data link. This poses a danger that the malicious application obtains personal information or personal content exchanged between the applications, and leaks the personal information or personal content to outside.

There has conventionally been a method of separating execution environments in each of which a software is executed, as a method of protecting, from a DL application and a DL device driver, an original function of a device such as a telephone function in a cellular phone (see NPL 1, for example). NPL 1 discloses, as the method of separating execution environments, a method of separating execution environments using a CPU having a plurality of modes such as a normal mode and a secure mode, and a method of separating execution environment using a virtualization technology.

FIG. 32 is a diagram showing the conventional method of separating execution environments using a virtualization technology which is disclosed by NPL 1

In FIG. 32, a virtual machine 30 executes an operating system (hereafter referred to as "OS") and an application which are selected and developed by, for example, a telecommunications carrier of cellular phone. A virtual machine 40 executes applications for providing, by an enterprise other than the telecommunications carrier, a schedule and email service for workers of the enterprise. A virtualization software 20 provides, for the virtual machines 30 and 40, a virtual hardware function obtained by virtualizing a hardware 10. In addition, the virtualization software 20 controls the operations of the virtual machines 30 and 40.

As shown in FIG. 32, the method of separating execution environments described in NPL 1 makes it possible to separate the virtual machine 30 which provides a communication function that is the basic function of the cellular phone and the virtual machine 40 which provides the service for the workers, in addition to the OS.

For example, this enables the malicious application or malicious device driver not to influence a group of applications for telecommunications carrier 33 and an OS for telecommunications carrier 32 which operate on the virtual machine 30, even when the virtual machine 40 has a function which allows the user to freely download applications and device drivers and when a malicious application or malicious device driver operates on the virtual machine 40. Moreover, even when data processing is performed, using the dynamic data link with other applications, between applications included in the group of applications for telecommunications carrier 33, the malicious application or malicious device driver cannot obtain data of the group of applications for enterprise 33.

CITATION LIST

Non Patent Literature

[NPL 1]
Intel Corporation and NTT DoCoMo, Inc. "Open and Secure Terminal Initiative (OSTI) Architecture Specification Revision 1.00", Oct. 16, 2006

SUMMARY OF INVENTION

Therefore, for instance, applying the method of separating execution environments described in NPL 1 to an information processing device (apparatus) such as the cellular phone makes it possible to prevent the data leakage caused by the malicious application and the malicious device driver in the information processing device.

However, an application which operates in the virtual machine 30 and an application which operates in the virtual machine 40 respectively operate on different virtual machines in the information processing device to which the method of separating execution environments described in NPL 1 is applied, and thus there is a problem that the application operating in the virtual machine 30 and the application operating in the virtual machine 40 cannot operate in cooperation with each other.

The present invention has been conceived to solve the conventional problem, and an object of the present invention is to provide an information processing device which can prevent the data leakage caused by the malicious application or malicious device driver, and allows the cooperation between the virtual machines.

In order to solve the conventional problem, an information processing device according to an aspect of the present invention is an information processing device having a plurality of virtual machines, including: an external connection unit configured to connect to an external device outside of the information processing device; and a communication control unit configured to obtain data from a first virtual machine among the virtual machines, transmit the data to a second virtual machine among the virtual machines, and transmit, to the external connection unit, transmission completion information indicating that the data is already transmitted to the second virtual machine, wherein the external connection unit is configured to (i) determine, based on the transmission completion information, whether or not a third virtual machine among the virtual machines is the second virtual machine to which the data is already transmitted, when the external connection unit receives, from the third virtual machine, a request for a connection to the external device, and (ii) permit a connection between the third virtual machine and the external device, when the external connection unit determines that the third virtual machine is not the second virtual machine to which the data is already transmitted.

With this configuration, execution environments of programs (applications or device drivers) executed by the virtual machines can be separated by the virtual machines, and the data is transmitted from the first virtual machine to the second virtual machine. Thus, it is possible to cause the virtual machines to cooperate with each other. Stated differently, it is possible to achieve data transfer (application link) between an application or device driver that is a program to be executed by the first virtual machine and an application or device driver that is a program to be executed by the second virtual machine. Furthermore, when the information processing device according to the aspect of the present invention determines that the third virtual machine is not the second virtual machine to which the data is already transmitted, the information processing device permits the connection between the third virtual machine and the external device. Consequently, even if a program to be executed by the third virtual machine is a malicious application or malicious device driver, data is not transmitted to the program from another virtual machine (program to be executed by the other virtual machine), and thus it is possible to prevent the leakage of the data even when the third virtual machine communicates with the external device.

To put it differently, with this configuration, even when an attack application (malicious application or malicious device driver) developed by a malicious attacker obtains information held by another application, the information processing device according to the aspect of the present invention makes it possible to prevent the information from leaking to the outside of the information processing device. As a result, even if the user cannot determine whether or not a DL application is the malicious application, the user can use the DL application without worrying about the information leakage. In addition, it is possible to achieve the application link between the different virtual machines.

Moreover, the external connection unit is configured to restrict the connection between the third virtual machine and the external device, when the external connection unit determines that the third virtual machine is the second virtual machine to which the data is already transmitted.

With this configuration, it is possible to prevent the third virtual machine, that is, the second virtual machine to which the data is already transmitted from communicating with the external device. As a result, even when the program to be executed by the third machine is the malicious application or malicious device driver, it is possible to prevent the data leakage to the outside caused by the program.

Moreover, the external connection unit is further configured to (i) specify a type of data transmitted to the third virtual machine, when the external connection unit determines that the third virtual machine is the second virtual machine to which the data is already transmitted, (ii) determine whether or not the type is a type of connection-restricted data, and (iii) restrict the connection between the third virtual machine and the external device, when the external connection unit determines that the type is the type of the connection-restricted data.

With this configuration, when the type of the transmitted data is the type of the connection-restricted data, the connection between the second virtual machine (third virtual machine) to which the data is already transmitted and the external device is restricted. Thus, when the type of the data transmitted to the third virtual machine is not the type of the connection-restricted data, the connection between the third virtual machine and the external device is permitted, thereby allowing the program to be executed by the third virtual machine to communicate with the external device. As a result, even when the program to be executed by the third virtual machine is the malicious application or malicious device driver, it is possible to prevent the leakage of the connection-restricted data while allowing the communication between the program and the external device.

Moreover, the communication control unit is configured to transmit, to the external connection unit, the transmission completion information including (i) an identifier assigned to the second virtual machine to which the data is already transmitted and (ii) a type of the data transmitted to the second virtual machine, and the external connection unit is further configured to (i) hold a transmitted data type management table which shows, for each of transmission-completed virtual machines, an identifier assigned to the transmission-completed virtual machine and a type of data transmitted to the transmission-completed virtual machine in association with each other, the transmission-completed virtual machines being, among the virtual machines, virtual machines to each of which data is already transmitted, and (ii) update the transmitted data type management table so that the transmitted data type management table shows the identifier and the type in association with each other, the identifier and the type being included in the transmission completion information transmitted by the communication control unit.

With this configuration, the identifier of the virtual machine to which the data is already transmitted and the type of the data are registered in and managed by the transmitted data type management table, and thus it is easy to specify, with reference to the transmitted data type management table, the type of the data transmitted to the third virtual machine which has requested the connection to the external device.

Moreover, the external connection unit is configured to obtain an identifier assigned to the third virtual machine, and specify the type of the data transmitted to the third virtual machine, by specifying, with reference to the transmitted data type management table, a type shown by the transmitted data type management table in association with the obtained identifier.

With this configuration, it is possible to easily specify the type of the data transmitted to the third virtual machine which has requested the connection to the external device.

Moreover, the communication control unit includes: a determining unit configured to determine whether or not a type of the data obtained from the first virtual machine is a type of transmission-restricted data; and a control unit configured to transmit the data obtained from the first virtual machine to the second virtual machine, and the transmission completion information to the external connection unit, only when the determining unit determines that the type of the data obtained from the first virtual machine is not the type of the transmission-restricted data.

With this configuration, only data having a type different from the type of the transmission-restricted data is transmitted from the first virtual machine to the second virtual machine, and it is possible to cause the virtual machines to cooperate with each other and to prevent the transmission-restricted data from being transmitted. Thus, it is possible to appropriately control the cooperation among the virtual machines.

Moreover, the control unit is configured to restrict the transmission of the data to the second virtual machine and the transmission of the transmission completion information to the external connection unit, when the determining unit determines that the type of the data obtained from the first virtual machine is the type of the transmission-restricted data.

With this configuration, even when, for instance, the program to be executed by the second virtual machine is the malicious application or malicious device driver, it is possible to prevent the program from using the transmission-restricted data, and strengthen the soundness of information processing.

Moreover, the information processing device further includes a type managing unit configured to set the type of the transmission-restricted data, according to a function to be used by a program to be executed by the second virtual machine, wherein the determining unit is configured to determine whether or not the type of the data obtained from the first virtual machine is the type of the transmission-restricted data set by the type managing unit.

With this configuration, the type of the transmission-restricted data is set according to the function to be used by the program to be executed by the virtual machine that is the transmission destination of the data, and thus it is possible to more appropriately control the cooperation among the virtual machines.

Moreover, the type managing unit is further configured to (i) hold a permission type management table which shows, for each of functions, a restriction type in association with the function, (ii) obtain the function to be used by the program to be executed by the second virtual machine, (iii) specify, with reference to the permission type management table, the restriction type shown by the permission type management table in association with the obtained function, and (iv) set the specified restriction type as the type of the transmission-restricted data.

With this configuration, the type of the transmission-restricted data is set with reference to the permission type management table which shows the function and the restriction type in association with each other, and thus it is possible to easily set the type of the transmission-restricted data corresponding to the function to be used by the program to be executed by the second virtual machine.

Moreover, the information processing device further includes a function managing unit configured to hold a function management table which shows, for each of the virtual machines, a function to be used by a program to be executed by the virtual machine and an identifier assigned to the virtual machine in association with each other, wherein the function managing unit is configured to specify the function to be used by the program to be executed by the second virtual machine, by specifying, with reference to the function management table, a function which is shown by the function management table in association with the identifier assigned to the second virtual machine, and the type managing unit is configured to obtain the function specified by the function managing unit.

With this configuration, the function to be used by the program to be executed by the second virtual machine is specified with reference to the function management table which shows the identifier of the virtual machine and the function to be used by the program to be executed by the virtual machine in association with each other.

Moreover, the communication control unit is further configured to (i) request a parent virtual machine to determine whether or not to permit the transmission of the data, when the communication control unit transmits the data obtained from the first virtual machine to the second virtual machine, the parent virtual machine being, among the virtual machines, a virtual machine which requests creation of the second virtual machine, and (ii) transmit the data to the second virtual machine, and the transmission completion information to the external connection unit, only when the parent virtual machine determines to permit the transmission of the data.

With this configuration, the parent virtual machine is requested to determine whether or not to permit the transmission of the data to the second virtual machine, and thus it is possible to make the appropriate determination according to the parent virtual machine (program to be executed by the parent virtual machine).

Moreover, the information processing device further includes a parent and child relationship managing unit configured to hold a parent and child relationship management table which shows, for each of the virtual machines, a child identifier assigned to the virtual machine and a parent identifier assigned to another virtual machine which requests creation of the virtual machine, wherein the parent and child relationship managing unit is configured to specify, with reference to the parent and child relationship management table, one of the parent identifiers shown by the parent and child relationship management table in association with a corresponding one of the child identifiers that is the same as the identifier assigned to the second virtual machine, and the communication control unit is configured to determine that one of the virtual machines to which the parent identifier specified by the parent and child relationship managing unit is assigned is the parent virtual machine, and request the parent virtual machine to make the determination.

With this configuration, it is possible to easily find the parent virtual machine which has requested the creation of the second virtual machine, with reference to the parent and child relationship management table which shows the child identifier and the parent identifier in association with each other.

It is to be noted that the present invention can be realized not only as such an information processing device but also as an information processing method having, as steps, the characteristic units included in the information processing device or a program causing a computer to execute the characteristic steps. It goes without saying that such a program can be distributed via a recording medium such as a CD-ROM and a transmission medium such as the Internet.

Furthermore, the present invention can be realized as a semiconductor integrated circuit (LSI) including part or all of the functions of the information processing device or as a program distribution system (application distribution system) including the information processing device.

The information processing device according to an implementation of the present invention prevents the data leakage caused by the malicious applications or malicious device drivers, and causes the virtual machines to be in cooperation with each other.

BRIEF DESCRIPTION OF DRAWINGS

FIG. 13 is a diagram showing an application-executing VM according to Embodiment 1 of the present invention.

FIG. 14 is a diagram showing a virtual machine management table according to Embodiment 1 of the present invention.

FIG. 15 is a diagram showing an application function management table according to Embodiment 1 of the present invention.

FIG. 16A is a diagram showing a permission type management table according to Embodiment 1 of the present invention.

FIG. 16B is a diagram showing a permission type management table according to Embodiment 1 of the present invention.

FIG. 17A is a diagram showing a transmitted data type management table according to Embodiment 1 of the present invention.

FIG. 17B is a diagram showing a connection permission/restriction management table according to Embodiment 1 of the present invention.

FIG. 17C is a diagram showing a type of limitation list according to Embodiment 1 of the present invention.

DETAILED DESCRIPTION OF INVENTION

The following describes embodiments according to the present invention with reference to the drawings.

Embodiment 1

When a DL application or DL device driver is executed, an information processing device according to Embodiment 1 of the present invention creates a virtual machine for the DL application or DL device driver. Consequently, even if a downloaded program is a malicious application or malicious device driver, the program is executed by the dedicated virtual machine, and thus the program cannot access information held in other programs. In this manner, the information processing device according to Embodiment 1 of the present invention prevents the malicious application or malicious device driver from accessing information held in other applications.

<Configuration of Application Distribution System 100>

Figure 1:
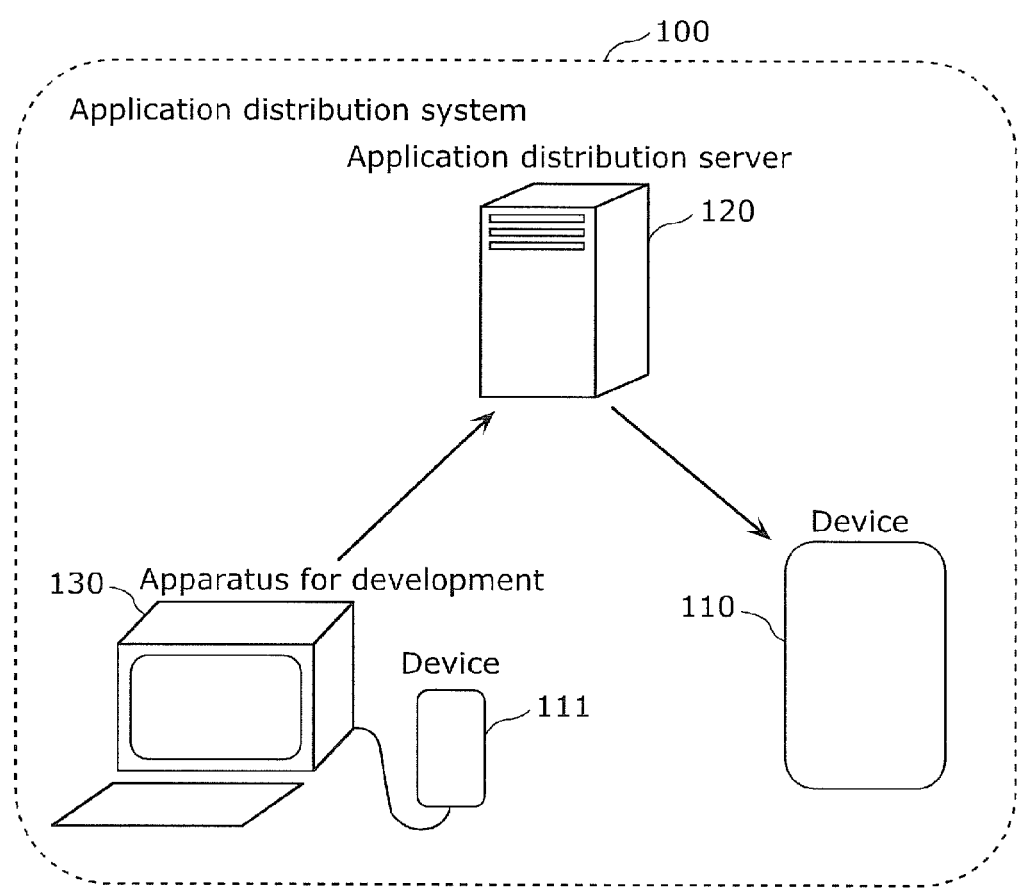
FIG. 1 is a schematic diagram showing a whole application distribution system according to Embodiment 1 of the present invention.

FIG. 1 is a schematic diagram showing an application distribution system 100 according to Embodiment 1 of the present invention.

The application distribution system (program distribution system) 100 shown in FIG. 1 includes a device 110, an application distribution server 120, an apparatus for development 130, and a device 111.

The device 110 is, for instance, a cellular phone having a network communication function. The device 110 is connected to the application distribution server 120 via a network, and downloads an application from the application distribution server 120. Moreover, the device 110 which has downloaded the application obtains a new function by installing the application. To put it differently, the device 110 (information processing device) according to this embodiment includes an obtaining unit which obtains an application (program) to be distributed from the application distribution server 120.

The application distribution server 120 is connected to the device 110 and the apparatus for development 130 via the network. The application distribution server 120 manages applications uploaded by the apparatus for development 130, and performs a process of downloading an application to the device 110.

The apparatus for development 130 is connected to the application distribution server 120 via the network, and is an apparatus for developing applications which operate on the device 110. Moreover, the apparatus for development 130 is connected to the device 111 via an interface compliant with, for example, the Universal Serial Bus (hereafter referred to as "USB") standards. A developer develops an application using the apparatus for development 130, and performs a test to determine whether or not the application operates on the device 111 in an expected manner. When the test finds an error in the application, the developer debugs the application using the apparatus for development 130. Subsequently, uploading the application to the application distribution server 120 allows the device 110 to use the application. It is to be noted that the devices 110 and 111 are devices having the same functions, and only differ in being used by a general user (the device 110) or the developer (the device 111).

Moreover, the devices 110 and 111 correspond to the information processing device according to an implementation of the present invention.

<Software Configuration for Devices 110 and 111>

Figure 2:
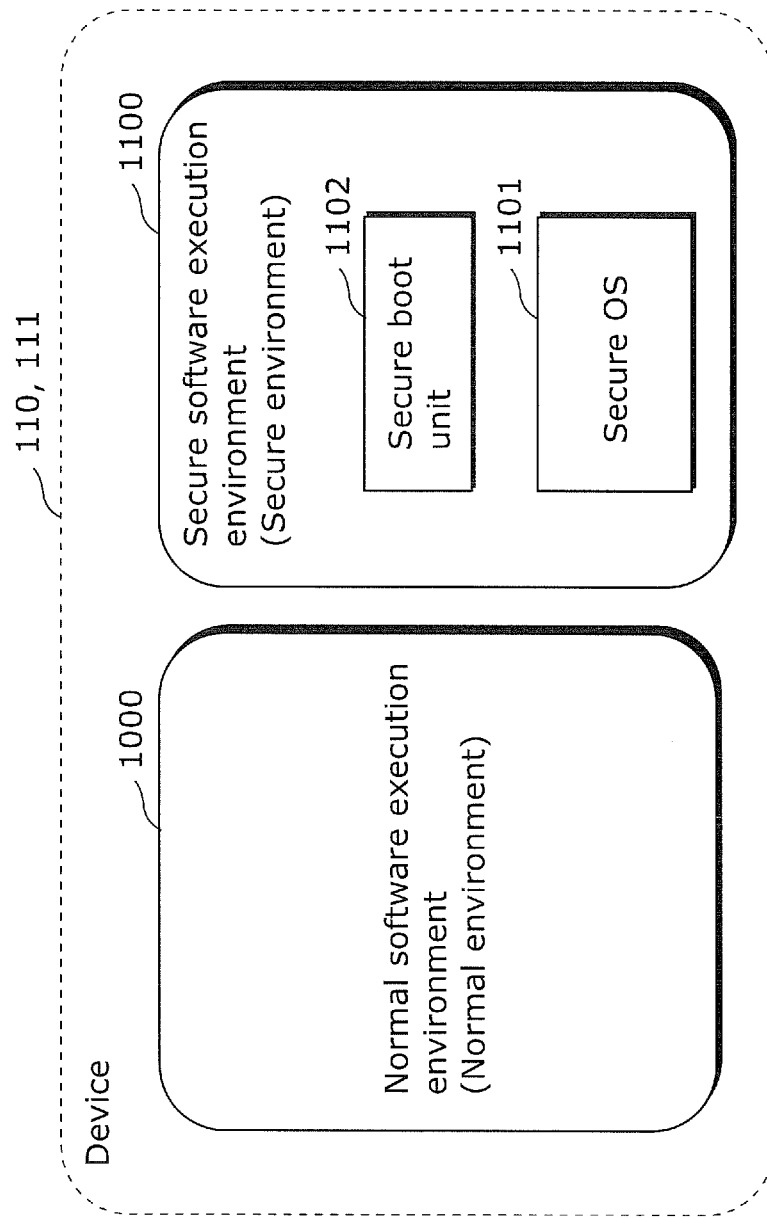
FIG. 2 is a software configuration diagram for devices according to Embodiment 1 of the present invention.

FIG. 2 is a software configuration diagram for the devices 110 and 111 according to Embodiment 1 of the present invention.

The devices 110 and 111 shown in FIG. 2 include a normal software execution environment (hereafter referred to as "normal environment") 1000 and a secure software execution environment (hereafter referred to as "secure environment") 1100. Each of the devices 110 and 111 executes a software (in the normal environment 1000 or secure environment 1100) by switching between the normal environment 1000 and the secure environment 1100.

The software in the secure environment 1100 includes a secure OS 1101 and a secure boot unit 1102. Here, the "secure OS" refers to a "secure operating system".

The secure OS 1101 manages the software in the secure environment 1100.

The secure boot unit 1102 performs secure boot when the device 110 or device 111 is turned ON. The secure boot process is described later with reference to a flowchart.

It is to be noted that it is possible to employ, for example, a technique disclosed by a patent literature (Japanese Unexamined Patent Application Publication No. 2005-011336) as the method for switching between the normal environment 1000 and the secure environment 1100.

<Software Configuration for Normal Environment 1000>

Figure 3:
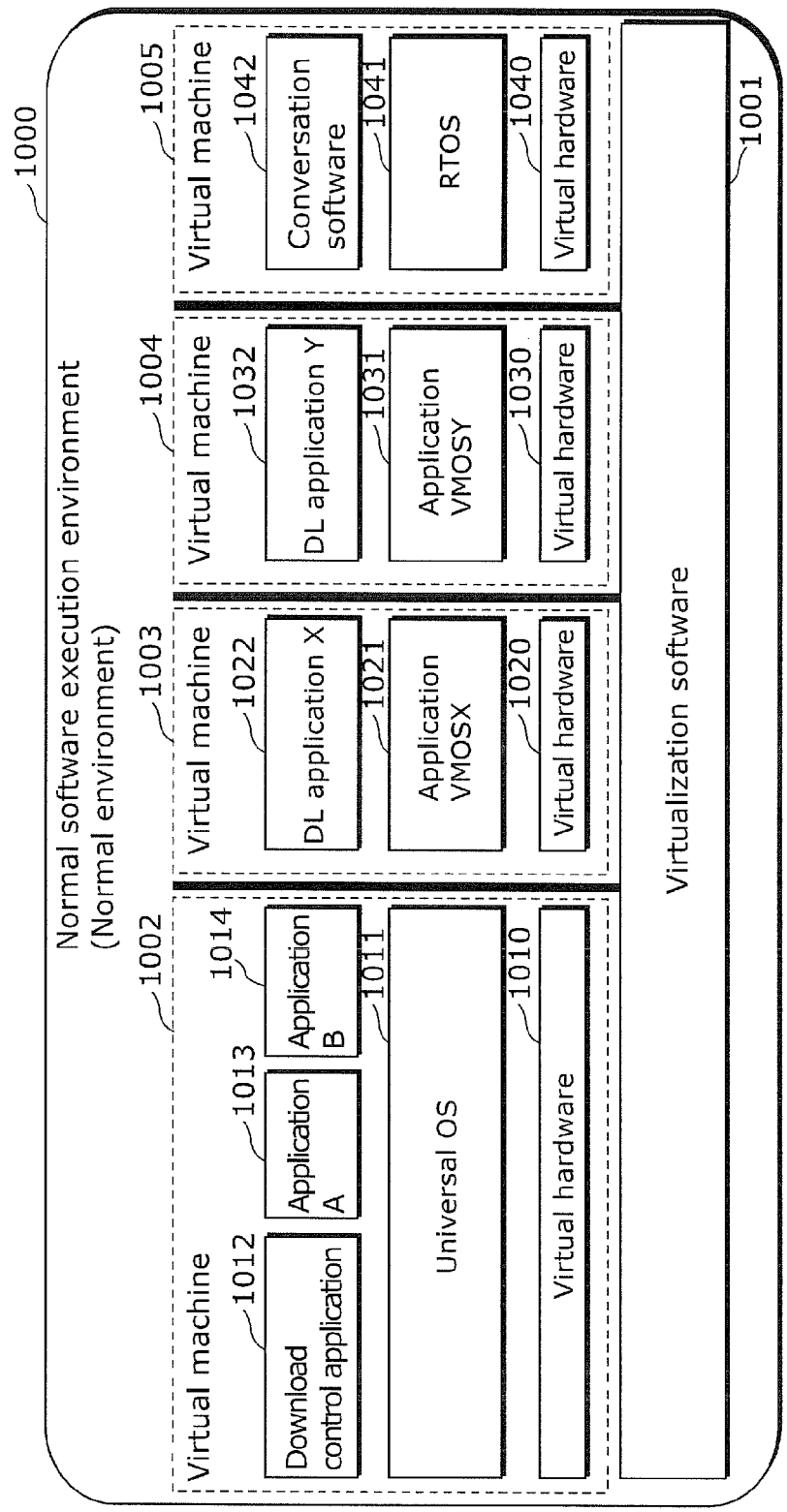
FIG. 3 is a schematic diagram showing a normal software execution environment according to Embodiment 1 of the present invention.

FIG. 3 is a software configuration diagram for the normal environment 1000 according to Embodiment 1 of the present invention.

The software in the normal environment 1000 shown in FIG. 3 includes a virtualization software 1001, and virtual machines 1002, 1003, 1004, and 1005.

The virtual machine 1002 includes a virtual hardware 1010, a universal OS 1011, a download control application 1012, an application A 1013, and an application B 1014. Moreover, the virtual machine 1003 includes a virtual hardware 1020, an application VMOSX 1021, and a DL application X 1022. Furthermore, the virtual machine 1004 includes a virtual hardware 1030, an application VMOSY 1031, and a DL application Y 1032. Moreover, the virtual machine 1005 includes a virtual hardware 1040, a RTOS 1041, and a conversation software 1042. Here, the "universal OS", the "application VMOS", the "DL application", and the "RTOS" are a "universal operating system", an "application VM operating system", a "downloaded application", and a "real-time operating system", respectively. In addition, the "VM" stands for "Virtual Machine".

The virtualization software 1001 functions to: control the virtual machines 1002 to 1005 operating thereon; allocate hardware resources such as a memory and a CPU to the virtual machines 1002 to 1005 and manage the hardware resources; access to devices according to requests from the virtual machines 1002 to 1005; and schedule the virtual machines 1002 to 1005.

The virtual machines 1002 to 1005 include the virtual hardwares, OSs, and applications, and are executed by the virtualization software 1001 independently from each other. Moreover, the virtual machines 1002 to 1005 are independent of each other, and there is no data transfer or exchange of instructions directly between the virtual machines. In other words, the data transfer or the exchange of the instructions between the virtual machines is always performed through the virtualization software 1001.

Each of the virtual hardwares 1010 to 1040 virtually provides a hardware function to a corresponding one of the virtual machines. Moreover, each of the virtual hardwares 1010 to 1040 includes an IPL (Initial Program Loader) and a BIOS (Basic Input/Output System). It is to be noted that each of the virtual hardwares 1010 to 1040 may be integrated into the virtualization software 1001 or the OS of the corresponding one of the virtual machines, depending on the configuration of the virtualization software 1001.

The universal OS 1011 loads applications (applications A 1013 and B 1014) into a memory and executes the applications, or deletes (unloads) an application (application A 1013 or B 1014) from the memory.

Furthermore, the universal OS 1011 requests the virtualization software 1001 to execute DL applications (DL application X 1022 and DL application Y 1032).

Moreover, the universal OS 1011 provides a network communication function for the download control application 1012 and the applications A 1013 and B 1014.

The download control application 1012 communicates with the application distribution server 120 connected to the device 110 via the internet, and performs a process of downloading an application to the device 110 and a process of installing the application to the device 110.

The applications A 1013 and B 1014 have functions such as an address management function, a web browse function, and an e-mail function, and provide these functions for the user.

In Embodiment 1 of the present invention, the DL applications are downloaded from the application distribution server 120 by the download control application 1012 operating on the universal OS 1011, and stored in the device 110. Subsequently, when the universal OS 1011 requests the virtualization software 1001 to execute the DL applications, the virtualization software 1001 performs setting so that each of the DL applications operates on one of the virtual machines. Consequently, the DL application is executed on the virtual machine.

It is to be noted that although Embodiment 1 of the present invention describes a case where the DL applications X 1022 and Y 1032 are downloaded from the application distribution server 120 and executed, the present invention is not limited to the case. In addition, the number of the virtual machines is not limited to 4. In other words, as long as the universal OS 1011 requests the virtualization software 1001 to execute the DL applications, 4 or more virtual machines may be created, or when the RTOS 1041 requests the virtualization software 1001 to execute the DL applications, such virtual machines may be created.

Each of the applications VMOSX 1021 and VMOSY 1031 is an OS operating on a virtual machine which operates a DL application. The application VMOSX 1021 has a function necessary for the DL application X 1022 to operate. The application VMOSY 1031 has a function necessary for the DL application Y 1032 to operate. It is to be noted that details of the applications VMOSX 1021 and VMOSY 1031 are described later.

Each of the DL applications X 1022 and Y 1032 is an application downloaded from the application distribution server 120. Like the applications A 1013 and B 1014, the DL applications X 1022 and Y 1032 provide various functions for the user.

The RTOS 1041 is an OS for operating software providing basic functions of the device.

The conversation software 1042 provides a conversation function that is one of basic functions of the devices 110 and 111.

It is to be noted that although the virtualization software 1001 performs setting so that each DL application operates on one of the virtual machines, the present invention is not limited to this. For instance, the virtualization software 1001 may perform setting so that each of applications (applications A 1013 and B 1014) not yet downloaded from the application distribution server 120 operates on one of the virtual machines or part of the DL applications operates on the universal OS 1011.

It is to be noted that the applications VMOSX 1021 and VMOSY 1031 may have different functions or the same functions. In addition, the applications VMOSX 1021 and VMOSY 1031 may have the same functions as the universal OS 1011.

<Hardware Configuration for Devices 110 and 111>

Figure 4:
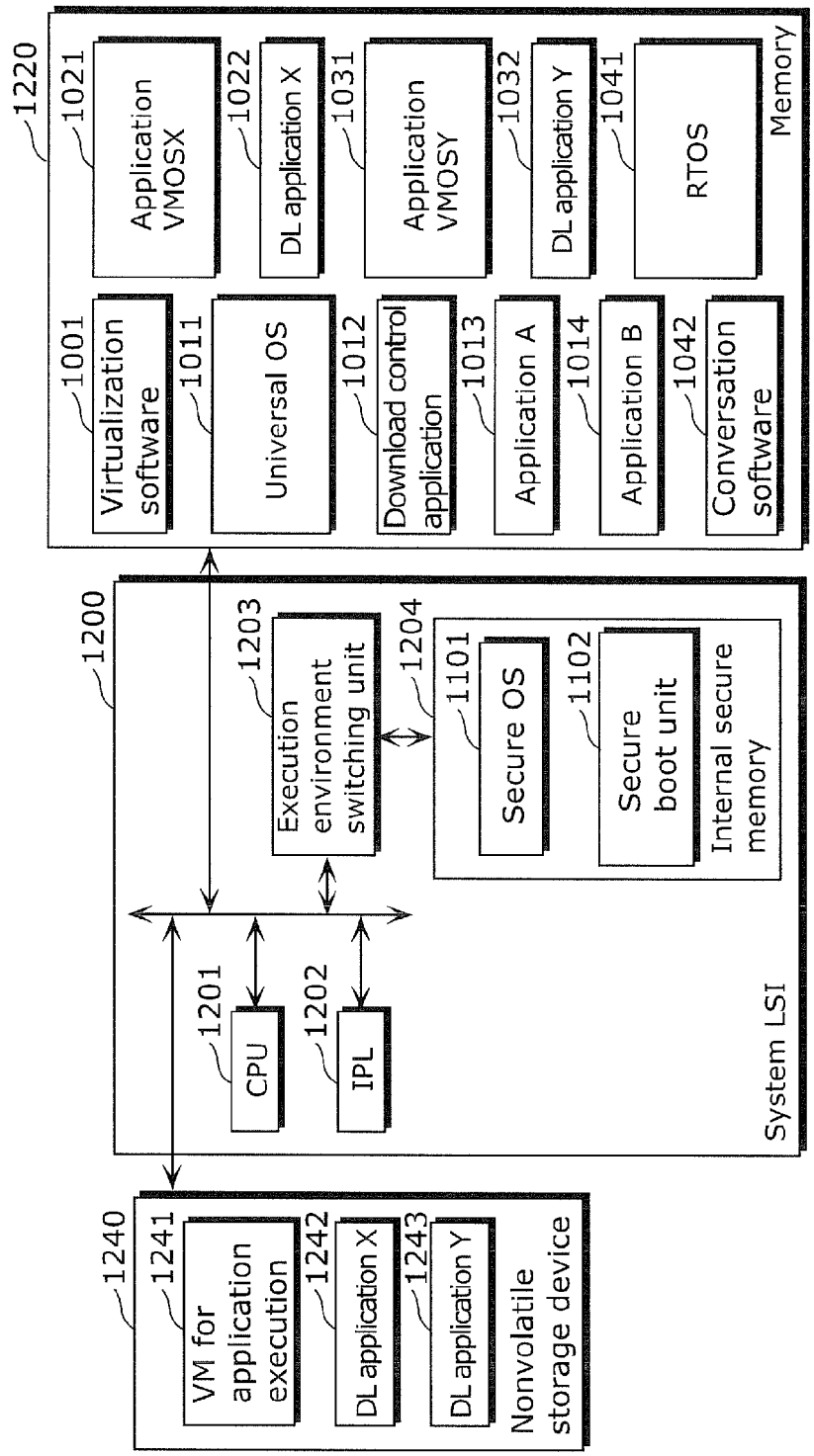
FIG. 4 is a hardware configuration diagram of each of devices according to Embodiment 1 of the present invention.

FIG. 4 is a hardware configuration diagram for each of the devices 110 and 111 according to Embodiment 1 of the present invention.

The elements in FIGS. 2 and 3 correspond to elements stored in an internal secure memory 1204 and a memory 1220 shown in FIG. 4. Each of functions is implemented by executing, on a CPU 1201, software for implementing each of the elements.

Each of the devices 110 and 111 shown in FIG. 4 includes a system LSI 1200, a nonvolatile memory device 1240, and the memory 1220. The system LSI 1200 is connected to the nonvolatile memory device 1240 and the memory 1220 via external buses.

The system LSI 1200 includes the CPU 1201, an IPL 1202, an execution environment switching unit 1203, and the internal secure memory 1204. It is to be noted that details of the system LSI 1200 are described later.

The memory 1220 stores the virtualization software 1001, the universal OS 1011, the download control application 1012, the applications A 1013 and B 1014, the application VMOSX 1021, the DL application X 1022, the application VMOSY 1031, the DL application Y 1032, the RTOS 1041, and the conversation software 1042. This shows a situation where each element shown in FIG. 3 is loaded into the memory 1220.

The nonvolatile memory device 1240 stores the application-executing VM 1241 and the DL applications X 1242 and Y 1243.

Although not shown, the nonvolatile memory device 1240 stores softwares to be stored in the memory 1220 and the internal secure memory 1204. Furthermore, the nonvolatile memory device 1240 may stores applications other than the applications A 1013 and B 1014 and the DL applications X 1242 and Y 1243.

The softwares which are encrypted with predetermined keys and are to be stored in the internal secure memory 1204 are stored in the nonvolatile memory device 1240. The softwares are stored in the nonvolatile memory device 1240 at the time of factory manufacturing of the device 110 or 111. Moreover, the softwares are deployed from the nonvolatile memory device 1240 to the memory 1220 and the internal secure memory 1204 at the time of system start-up or at the time of request for application start-up.

It is to be noted that the keys for encrypting the softwares to be stored in the internal secure memory 1204 may be the same for all the devices or may differ for the respective system LSIs 1200 or the softwares. Moreover, keys for decrypting the encrypted softwares may be stored in a key storage unit (not shown) in the system LSI 1200, or the softwares which are encrypted with keys stored in the system LSI 1200 may be stored in the nonvolatile memory device 1240.

Although each of the devices 110 and 111 further includes, for example, an input and output unit not shown in FIG. 4, a description of the input and output unit and so on is omitted as they do not constitute the essence of the present invention. In addition, although the system LSI 1200 includes, for example, a peripheral circuit not shown in FIG. 4, a description of the peripheral circuit and so on is omitted as they do not constitute the essence of the present invention.

<Configuration of System LSI 1200>

The following describes in detail each of the elements in the system LSI 1200 according to Embodiment 1 of the present invention.

The CPU 1201 controls operations of the entire device 110 or 111 by executing instruction codes in, for example, the softwares stored in the memory 1220 and the internal secure memory 1204. Moreover, the CPU 1201 has two modes, a privileged mode and a non-privileged mode, as operation modes. The universal OS 1011 operates in the privileged mode, and the download control application 1012 and the applications A 1013 and B 1014 operate in the non-privileged mode.

The IPL 1202 is a software which starts first when the device 110 or 111 is powered on. The IPL 1202 starts the secure OS 1101 deployed in the internal secure memory 1204 and the virtualization software 1001 deployed in the memory 1220, when the device 110 or 111 is powered on. The IPL 1202 is stored in a mask ROM provided in the system LSI 1200.

The execution environment switching unit 1203 switches between the normal environment 1000 and the secure environment 1100 of the system LSI 1200. The execution environment switching unit 1203 performs access control so that the internal secure memory 1204 is accessible from, for example, the CPU 1201 only when the execution environment of the system LSI 1200 is the secure environment.

The internal secure memory 1204 stores the secure OS 1101 and the secure boot unit 1102.

It is to be noted that the system LSI 1200 may further include a nonvolatile secure memory (not shown). The execution environment switching unit 1203 performs access control on the nonvolatile secure memory so that the nonvolatile secure memory is accessible from, for example, the CPU 1201 only when the execution environment of the system LSI 1200 is the secure environment. It is to be noted that the nonvolatile secure memory may store the softwares to be stored in the internal secure memory 1204 or the keys for decrypting the encrypted softwares.

<Configuration of Application Distribution Server 120>

Figure 5:
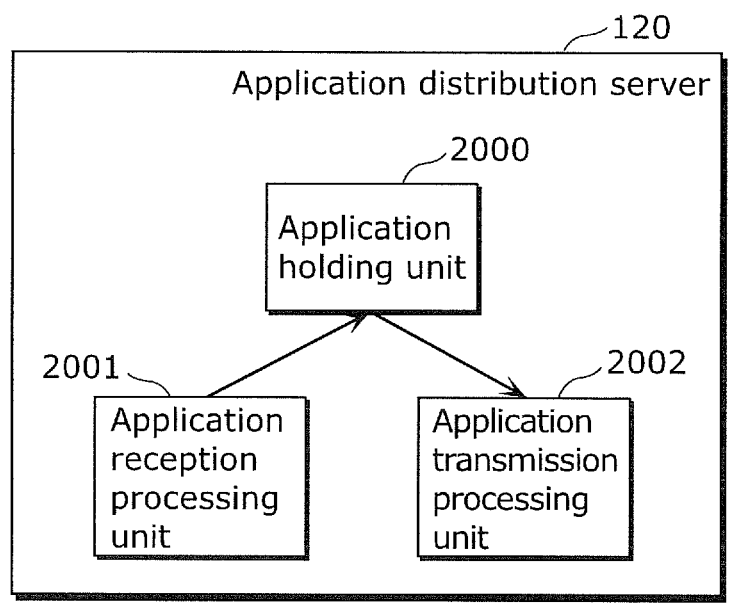
FIG. 5 is a block diagram showing an application distribution server according to Embodiment 1 of the present invention.

FIG. 5 is a schematic diagram showing the application distribution server 120 according to Embodiment 1 of the present invention.

The application distribution server 120 shown in FIG. 5 includes an application holding unit 2000, an application reception processing unit 2001, and an application transmission processing unit 2002.

The application holding unit 2000 holds applications managed by the application distribution server 120.

The application reception processing unit 2001 communicates with the apparatus for development 130 connected via the network, to receive applications uploaded by the apparatus for development 130. Moreover, the application reception processing unit 2001 transmits the received applications to the application holding unit 2000, and requests the application holding unit 2000 to hold and manage the transmitted applications.

The application transmission processing unit 2002 communicates with the device 110 connected via the network. The application transmission processing unit 2002 obtains, from the application holding unit 2000, applications requested by the device 110, and transmits the requested applications to the device 110. Moreover, the application transmission processing unit 2002 creates a list of applications held in the application holding unit 2000, and transmits the created list to the device 110.

<Configuration of Apparatus for Development 130>

Figure 6:
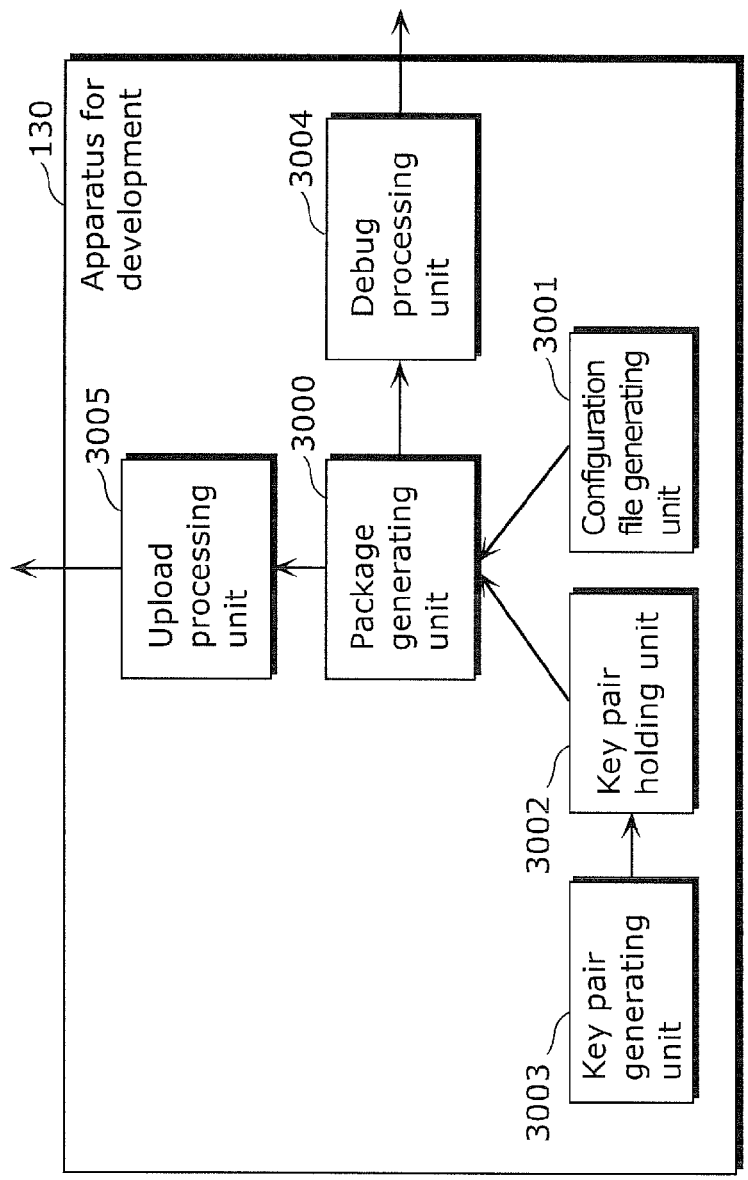
FIG. 6 is a block diagram showing a development environment according to Embodiment 1 of the present invention.

FIG. 6 is a block diagram showing the apparatus for development 130 according to Embodiment 1 of the present invention.

The apparatus for development 130 shown in FIG. 6 includes a package generating unit 3000, a configuration file creating unit 3001, a key pair holding unit 3002, a key pair generating unit 3003, a debug processing unit 3004, and an upload processing unit 3005.

The package generating unit 3000 creates an application by compiling source codes developed by a developer. Then, the package generating unit 3000 generates a package file (download package) in which an application signature (Signature), a configuration file, and a public key certificate (Certificate) are added to the created application. As an example, a signature scheme using the RSA method can be used for the application signature scheme. It is to be noted that details of the above are described later.

It is to be noted that the application signature (digital signature) scheme is not limited to the RSA method, and other signature schemes may be used. For instance, NPL 2 (Okamoto, Tatsuaki, and Hiroshi Yamamoto. "Gendai Ango" *Sangyo Tosho* 1997) describes in detail the other signature schemes in pages 171 to 188. Moreover, NPL 4 (ITU-T Recommendation X.509 (August 2005): Information Technology—Open Systems Interconnection—The Directory: Authentication Framework, 2005) describes in detail the public key certificate.

The configuration file creating unit 3001 creates the configuration file to be added to the application. The configuration file includes various information items such as information indicating which resource of a device the application is to use, information about a developer of the application, and information indicating what kind of service the application provides for other applications. The configuration file creating unit 3001 creates the information items based on values set by the application developer.

The key pair holding unit 3002 holds keys (a key pair of a private key and a public key in a public-key cryptosystem) for use in generating and verifying the application signature to be added to the package. For example, the key pair holding unit 3002 holds the public key in a format of the public key certificate described in NPL 4 (ITU-T Recommendation X.509).

The key pair generating unit 3003 generates the key pair of the private key and the public key in the public-key cryptosystem, and holds the generated key pair in the key pair holding unit 3002.

It is to be noted that NPL 2 describes in detail the public-key cryptosystem in pages 107 to 130.

The debug processing unit 3004 communicates with the device 111 connected to the apparatus for development 130 through, for example, a USB, and performs a process of debugging an application developed by the developer. Examples of the process of debugging include, for example, a process of installing an application by using the generated package, a process of executing the installed application, a process of setting a breakpoint, and a process of obtaining a log output.

The upload processing unit 3005 communicates with the application distribution server 120 connected to the apparatus for development 130 via the network, and performs a process of uploading, to the application distribution server 120, the package generated by the package generating unit 3000.

<Configuration of Package Generating Unit 3000>

Figure 7:
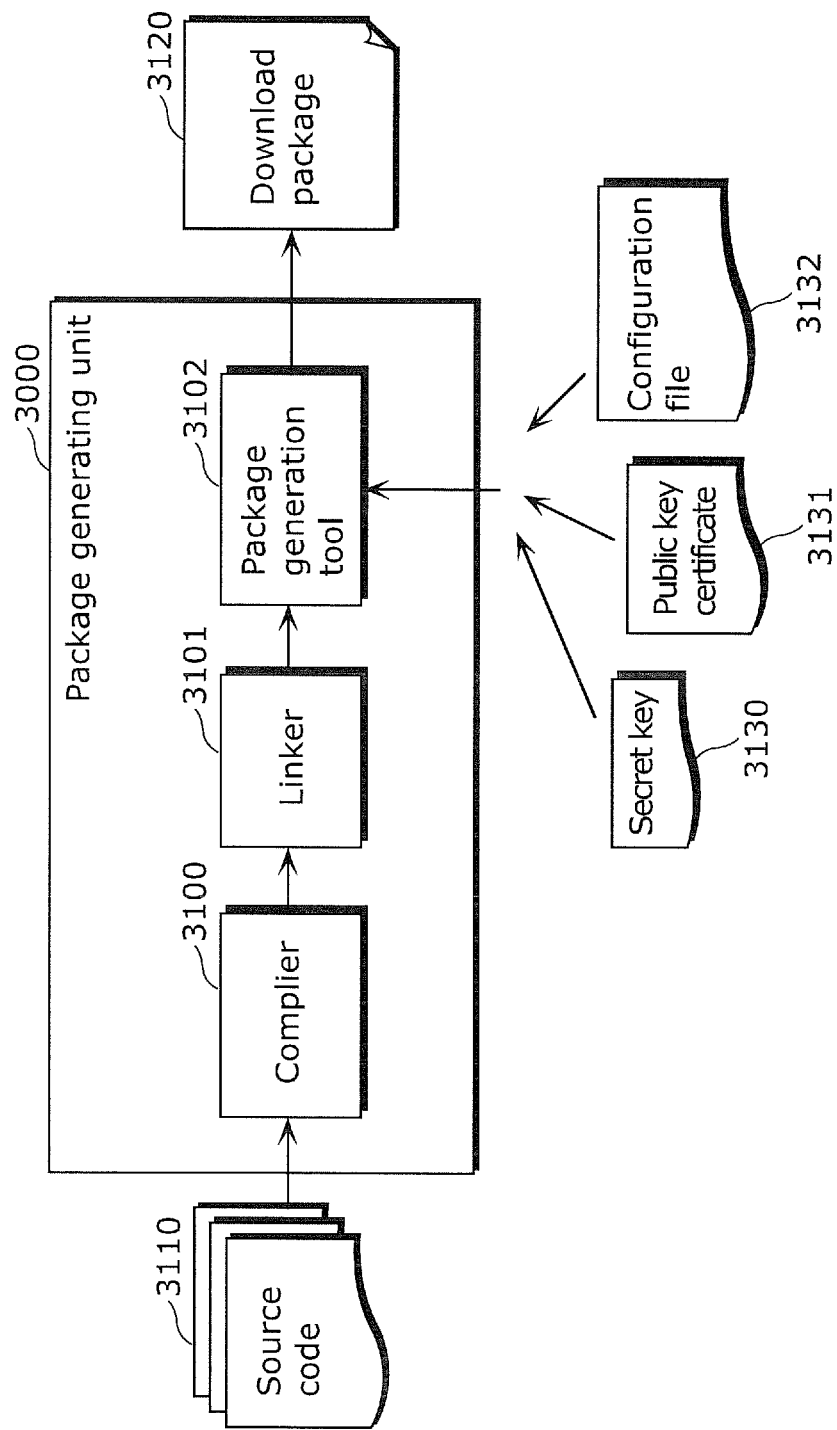
FIG. 7 is a block diagram showing a package generating unit according to Embodiment 1 of the present invention.

FIG. 7 is a block diagram showing the package generating unit 3000 according to Embodiment 1 of the present invention.

The package generating unit 3000 shown in FIG. 7 includes a compiler 3100, a linker 3101, and a package generation tool 3102.

The compiler 3100 creates an object file by compiling inputted source codes 3110.

The linker 3101 creates a file (executable file) that can be executed by the devices 110 and 111, by linking the object file created by the compiler 3100 and a library.

The package generation tool 3102 generates a download package 3120 using the executable file created by the linker 3101, a configuration file 3132 created by the configuration the creating unit 3001, and a private key 3130 and a public key certificate 3131 held in the key pair holding unit 3002.

<Structure of Download Package 3120>

Figure 8:
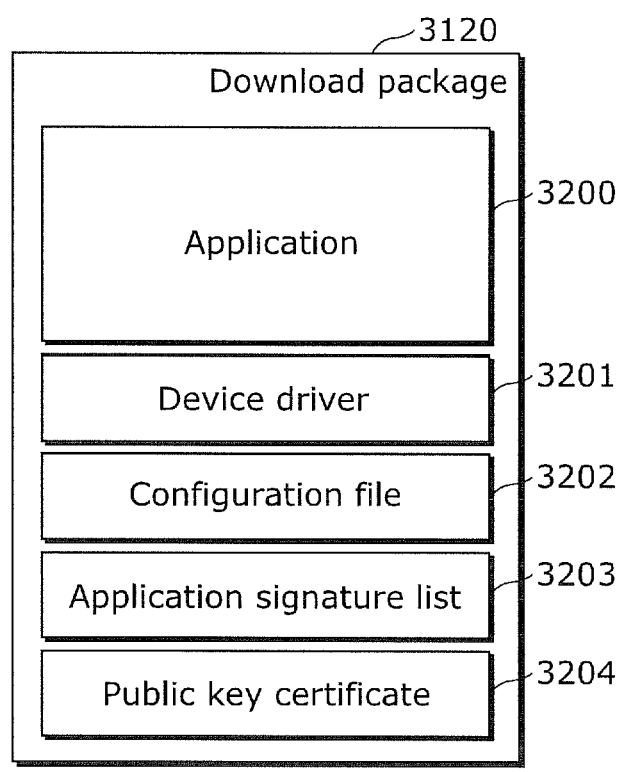
FIG. 8 is a diagram showing a download application package according to Embodiment 1 of the present invention.

FIG. 8 is a diagram showing the download package 3120 according to Embodiment 1 of the present invention.

In FIG. 8, the download package 3120 includes an application 3200, a device driver 3201, a configuration file 3202, an application signature list 3203, and a public key certificate 3204.

The application 3200 and the device driver 3201 are executable files created by the compiler 3100 and the linker 3101 from the source codes developed by the developer.

The configuration file 3202 is the same as the configuration file 3132 inputted to the package generation tool 3102.

The application signature list 3203 is a list including signatures of the application 3200, the device driver 3201, and the configuration file 3202. The package generation tool 3102 generates the signatures from the application 3200, the device driver 3201, and the configuration file 3202 that are inputted at the time of generating the download package 3120, and creates the application signature list 3203. The private key 3130 is used by the application signature list 3203 to generate the signatures.

The public key certificate 3204 is the same as the public key certificate 3131 inputted to the package generation tool 3102.

It is to be noted that although the download package 3120 includes, as a file, each of the application 3200, the device driver 3201, the configuration file 3202, the application signature list 3203, and the public key certificate 3204, the present invention is not limited to this. For instance, each of the files may be one or plural in number. Moreover, part of the files may be included in the download package 3120. Furthermore, the files may be downloaded in one file as the download package 3120, may be separately downloaded, or may be divided into files and downloaded.

It is to be noted that the application signature list 3203 may include a signature for the entire list including the signatures of the application 3200, the device driver 3201, and the configuration file 3202. Moreover, the download package 3120 may include the signatures of the application signature list 3203.

<Configuration Files 3132 and 3202>

Figure 9:
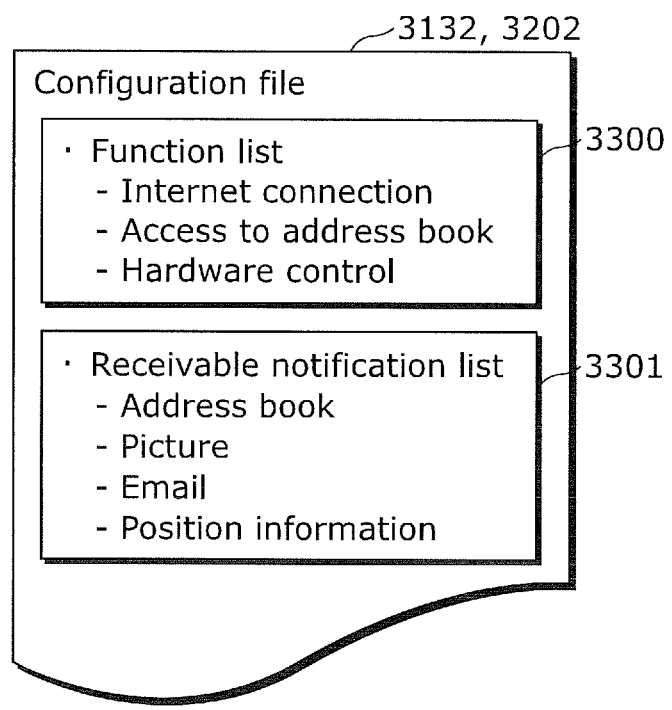
FIG. 9 is a diagram showing a configuration file according to Embodiment 1 of the present invention.

FIG. 9 is a diagram showing a configuration file according to Embodiment 1 of the present invention.

In FIG. 9, the configuration file 3132 or 3202 includes a function list 3300 and a receivable notification list 3301.

The function list 3300 is a list in which functions to be used by the application 3200 are registered. Examples of the functions include an "internet connection" function for connecting to the internet, an "address book access" function for reading and writing address book data, and a "hardware control" function for controlling ON and OFF of an LCD backlight or speaker volume.

The receivable notification list 3301 is a list in which data types receivable by the application 3200 in dynamic data link are registered. Examples of the data types include "address book", "picture", "email", and "position information".

<Secure Boot Process>

The devices 110 and 111 verify, at the time of their start-up, whether or not the virtualization software 1001 and a software operating in the secure environment 1100 have been tampered with.

Figure 10:
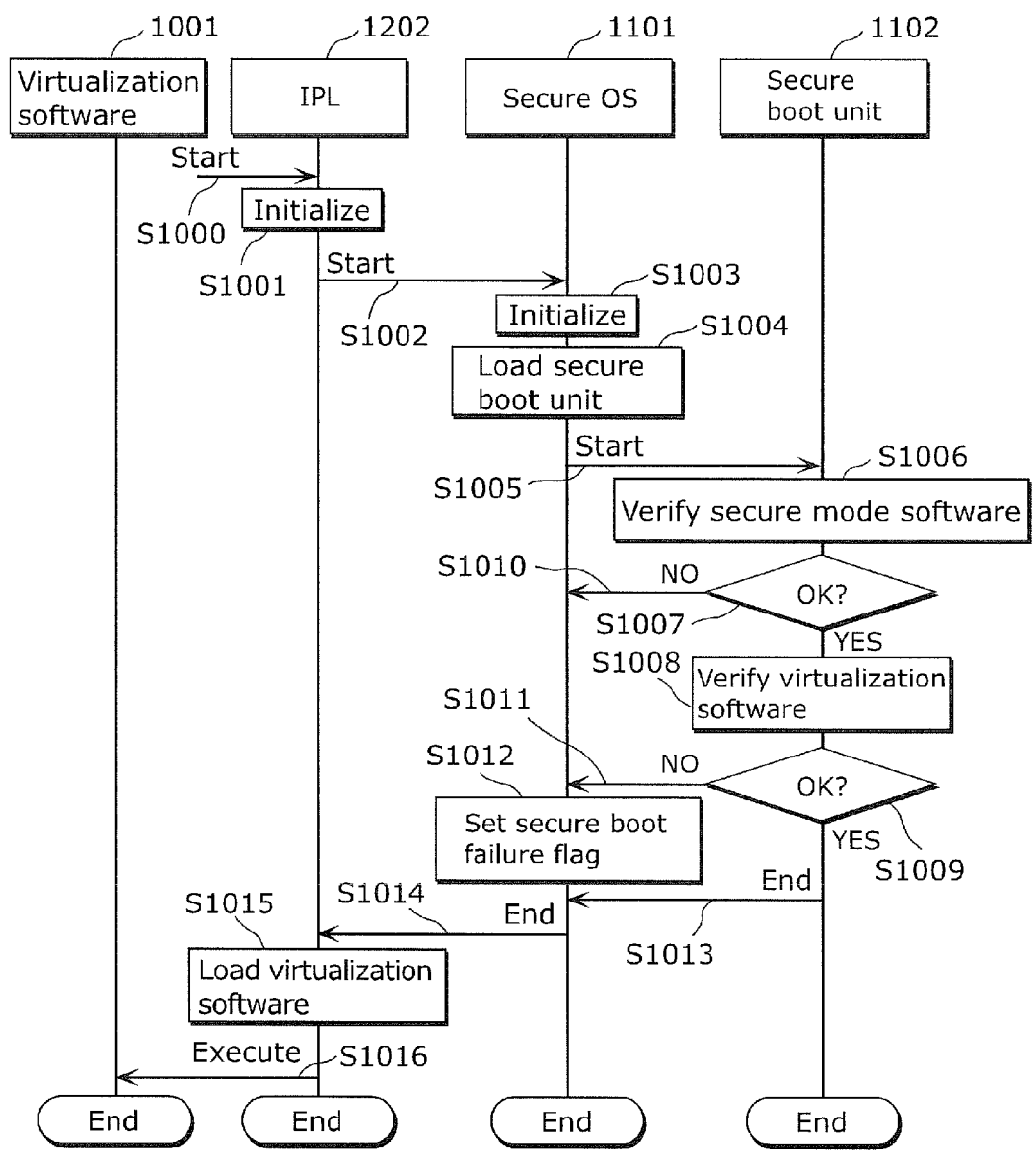
FIG. 10 is a flowchart showing secure boot according to Embodiment 1 of the present invention.

The following describes a method (secure boot process) from when the devices 110 and 111 are powered on to when the virtualization software 1001 starts, with reference to a flowchart shown in FIG. 10.

FIG. 10 is the flowchart showing the secure boot process.

When powered on, the device 110 or 111 starts the IPL 1202 in the system LSI 1200 (S1000).

The IPL 1202 first performs an initialization process on hardware of the device 110 or 111 (S1001). In the initialization process, the following processes are performed: operation check on the memory 1220, initialization of the execution environment switching unit 1203, initialization of the peripheral circuit (not shown), and so on. Subsequently, the secure OS 1101 is started (S1002).

The secure OS 1101 performs initialization of the secure environment 1100 (implementation of a secure software execution environment), thereby allowing an application to operate in the secure environment 1100 (S1003). Subsequently, the secure OS 1101 loads the secure boot unit 1102 (S1004), and starts the secure boot unit 1102 (S1005).

Here, the secure boot unit 1102 is stored in encrypted state in the nonvolatile memory device 1240. Thus, the execution environment switching unit 1203 decrypts the encrypted secure boot unit 1102 using a key unique to the system LSI 1200, and loads the decrypted secure boot unit 1102 to the internal secure memory 1204.

The secure boot unit 1102 verifies the secure OS 1101 and the secure boot unit 1102 (S1006). As a verification method, the secure boot unit 1102 verifies whether or not the secure OS 1101 and the secure boot unit 1102 have been tampered with, by generating a hash value of a software and comparing the generated hash value with a pre-calculated reference hash value. Here, the reference hash value is calculated before factory shipment, and is embedded in the secure boot unit 1102. Moreover, the secure boot unit 1102 is encrypted with the reference hash value embedded, and stored in the nonvolatile memory device 1240.

It is to be noted that although the hash value is used in the verification method for software here, the present invention is not limited to this. A method in which a signature is used instead of the hash value may be employed. Here, the secure boot unit 1102 may be encrypted with a public key for use in signature verification embedded, and stored in the nonvolatile memory device. The public key may be stored in the nonvolatile memory device 1240 separately from the secure boot unit

1102. Moreover, the secure boot unit 1102 may obtain the public key from another apparatus outside the device.

When the secure boot unit 1102 determines that the secure OS 1101 and the secure boot unit 1102 have not been tampered with, based on a result of the verification of the secure OS 1101 and the secure boot unit 1102 in step S1006, the secure boot unit 1102 determines YES in step S1007, and the flow proceeds to step S1008. Moreover, when the secure boot unit 1102 determines that one of the secure OS 1101 and the secure boot unit 1102 has been tampered with, based on the result of the verification of the secure OS 1101 and the secure boot unit 1102 in step S1006, the secure boot unit 1102 determines NO in step S1007, and the flow proceeds to step S1012.

When the secure boot unit 1102 determines YES in step S1007, the secure boot unit 1102 verifies the virtualization software 1001 (S1008). For instance, the secure boot unit 1102 employs the same verification method as in step S1006.

When the secure boot unit 1102 determines that the virtualization software 1001 has not been tampered with, based on a result of the verification of the virtualization software 1001 in step S1008, the secure boot unit 1102 determines YES in step S1009, ends the process, and returns the process to the secure OS 1101. In contrast, when the secure boot unit 1102 determines that the virtualization software 1001 has been tampered with, based on the result of the verification in step S1008, the secure boot unit 1102 determines NO in step S1009, and the flow transits to step S1012.

When the secure boot unit 1102 determines NO in either step S1007 or step S1009, an actor of the process operation changes from the secure boot unit 1102 to the secure OS 1101 (S1010, S1011), and the secure OS 1101 sets a secure boot failure flag (S1012). The secure boot failure flag is data stored in a specific area of the internal secure memory 1204 (not shown). The secure OS 1101 and an application which operates on the secure OS 1101 recognize a state of the device 110 or 111 by checking the secure boot failure flag, and determine whether to operate or not.

After the end of the process in step S1009, the secure boot unit 1102 returns the process to the secure OS 1101 (S1013).

When the process is returned from the secure boot unit 1102, the secure OS 1101 returns the process to the IPL 1202 (S1014).

The IPL 1202 loads, to the memory 1220, the virtualization software 1001 stored in the nonvolatile memory device 1240 (S1015), and executes (starts) the virtualization software 1001 (S1016).

It is to be noted that secure boot which is defined by the MPWG (Mobile Phone Work Group) of the TCG (Trusted Computing Group) may be employed in the secure boot process.

Moreover, here, although the verification of the secure mode software (S1006) is followed by the verification of the virtualization software (S1008), the present invention is not limited to this. For example, after the secure boot unit 1102 performs the verification of the secure mode software (S1006), the secure boot unit 1102 may temporarily return the process to the IPL 1202, and the IPL 1202 may successively request, via the secure OS 1101, the verification of the virtualization software (S1008) from the secure boot unit 1102.

Furthermore, although the secure boot process ends when the virtualization software 1001 is executed, the present invention is not limited to this. A scope of the secure boot process may include an IPL, an OS, and an application in a virtual machine. In the case where the scope of the secure boot process includes the IPL, the OS, and the application, each of the IPL, the OS, and the application verifies whether or not a software to be started next has been tampered with, and then starts (executes) the software to be started next.

<Start Process of Virtual Machine>

The virtualization software 1001 starts a predetermined virtual machine at the time of device startup. In addition, the virtualization software 1001 newly creates a virtual machine in response to a request from a running virtual machine.

Figure 11:
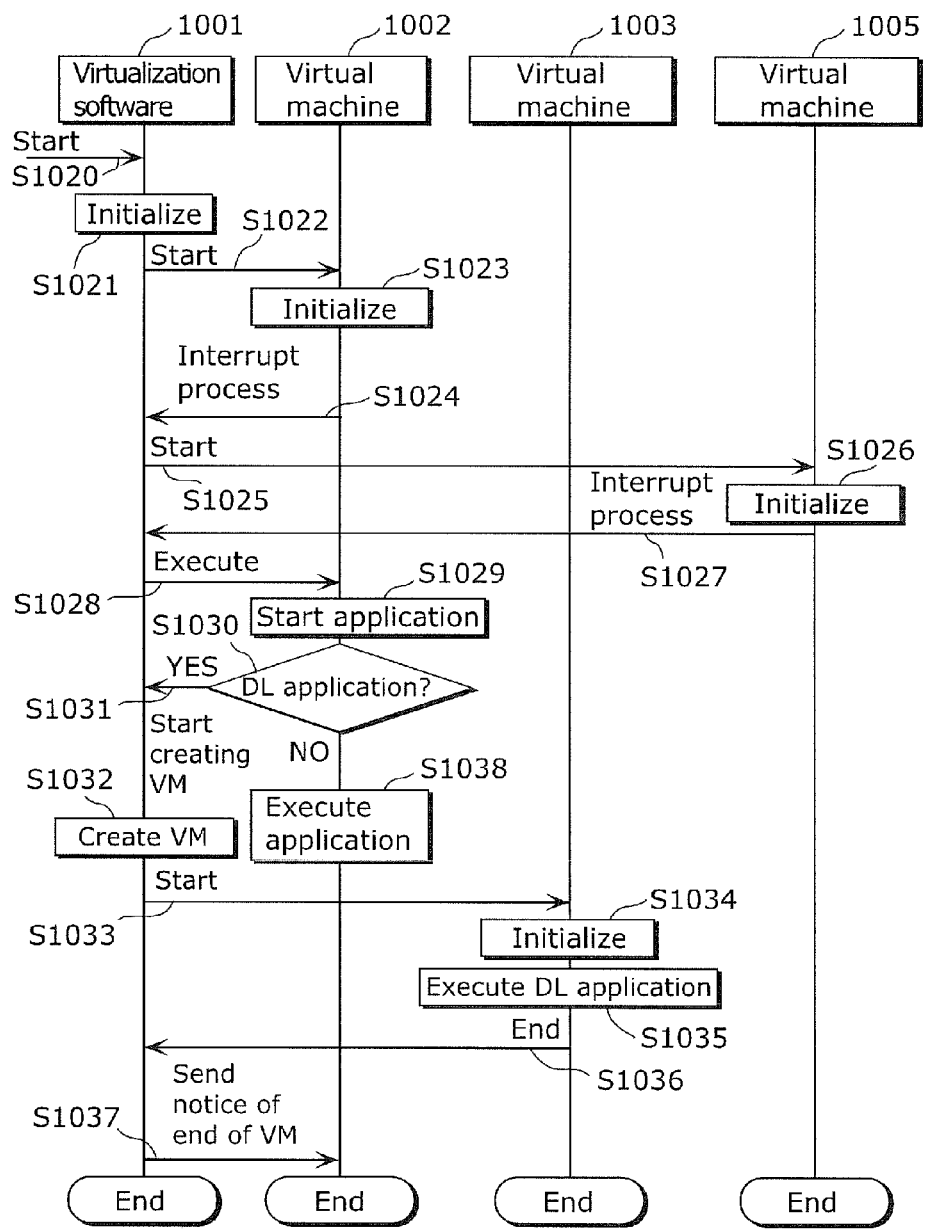
FIG. 11 is a flowchart showing start of a virtual machine according to Embodiment 1 of the present invention.

The following describes a process in which each of virtual machines starts after a start of the virtualization software 1001 with reference to a flowchart shown in FIG. 11.

FIG. 11 is the flowchart showing the start of each virtual machine.

The virtualization software 1001 is started by the IPL 1202 at the end of the secure boot process (S1020), and performs an initialization process (S1021). After the initialization process, the virtualization software 1001 sets aside hardware resources such as a memory for executing the virtual machine 1002, and then starts the virtual machine 1002 (S1022).

When started, the virtual machine 1002 first performs an initialization process (S1023). The virtual machine 1002 executes the IPL 1202 in the virtual hardware 1010 as the initialization process. Moreover, the virtual machine 1002 loads the universal OS 1011 to the memory, and executes the universal OS 1011. Subsequently, during or after a start process of the universal OS 1011, a process request from the virtual machine 1002 to the virtualization software 1001 or hardware interrupt interrupts a process of the virtual machine 1002, and the process is returned to the virtualization software 1001 (S1024).

Next, the virtualization software 1001 sets aside hardware resources such as a memory for executing the virtual machine 1005, and starts the virtual machine 1005 (S1025).

When started, the virtual machine 1005 first performs an initialization process (S1026). The virtual machine 1005 executes the IPL 1202 in the virtual hardware 1040 as the initialization process. Moreover, the virtual machine 1005 loads the RTOS 1041 to the memory, and executes the RTOS 1041. Subsequently, during or after a start process of the RTOS 1041, the process request from the virtual machine 1005 to the virtualization software 1001 or the hardware interrupt interrupts a process of the virtual machine 1005, and the process is returned to the virtualization software 1001 (S1027).

Then, the virtualization software 1001 schedules each virtual machine according to a scheduling function.

The virtual machine 1002 is executed according to the scheduling function (S1028). Here, when the user using the device requests start of an application, the virtual machine 1002 starts the application (S1029).

At the time of starting the application, the virtual machine 1002 determines whether the application of which start has been requested is to be operated by the virtual machine 1002 or another virtual machine. Specifically, the virtual machine 1002 determines whether or not the application of which start has been requested is a DL application (S1030). It is to be noted that the DL application is not limited to an application downloaded from another apparatus via the network, and may be an application obtained from still another apparatus. For instance, the DL application may be an application which the device 110 obtains via a recording medium detachable to the device 110 after shipment. Alternatively, the virtual machine 1002 may determine whether or not the application of which start has been requested is a DL device driver.

When the application is the DL application, the virtual machine 1002 determines "YES", and when the application is not the DL application, the virtual machine 1002 determines "NO". For example, the virtual machine 1002 uses an extension assigned to a file name of the application of which start has been requested, for the determination of the DL application.

When the virtual machine 1002 determines "YES" in step S1030, the virtual machine 1002 requests the virtualization software 1001 to create a VM (application VM) for executing the application of which start has been requested (S1031).

The virtualization software 1001 creates the virtual machine 1003 for executing DL application (S1032), and starts the virtual machine 1003 (S1033). Details of the VM creation process are described later with reference to a flowchart.

When started, the virtual machine 1003 performs an initialization process (S1034), and executes the application (DL application) of which start has been requested (S1035). Moreover, during the execution of the DL application (S1035), a process request from the virtual machine 1003 to the virtualization software 1001 or hardware interrupt may interrupt a process of the virtual machine 1003, and the process may be returned to the virtualization software 1001. In this case, when the virtual machine 1003 is rescheduled, the virtual machine 1003 executes the interrupted process according to the scheduling function of the virtualization software 1001. When the application ends, the virtual machine 1003 sends notice of an end of the virtual machine to the virtualization software 1001 (S1036).

Upon receiving the notice of the end from the virtual machine 1003, the virtualization software 1001 sends notice of the end of the VM to the virtual machine 1002 (S1037).

Upon receiving the notice of the end of the VM, the virtual machine 1002 recognizes that the application of which start was requested in step S1029 has ended.

On the other hand, when the virtual machine 1002 determines "NO" in step S1030, the virtual machine 1002 executes the application of which start has been requested (S1038).

As stated above, each of the devices 110 and 111 according to Embodiment 1 of the present invention starts the predetermined virtual machine at the time of the start of a corresponding one of the devices 110 and 111. Furthermore, when the user requests the started predetermined virtual machine to start the DL application, each of the devices 110 and 111 additionally starts a virtual machine for DL application (virtual machine 1003), and executes the DL application in the virtual machine.

It is to be noted that when the virtual machine 1002 requests creation of another VM for executing DL application, during the interruption of the process of the virtual machine 1003, each of the devices 110 and 111 creates a virtual machine (e.g. virtual machine 1004) other than the virtual machine 1003, and allows the DL applications to be operated on the different virtual machines, respectively.

<Configuration of Virtualization Software 1001>

Figure 12:
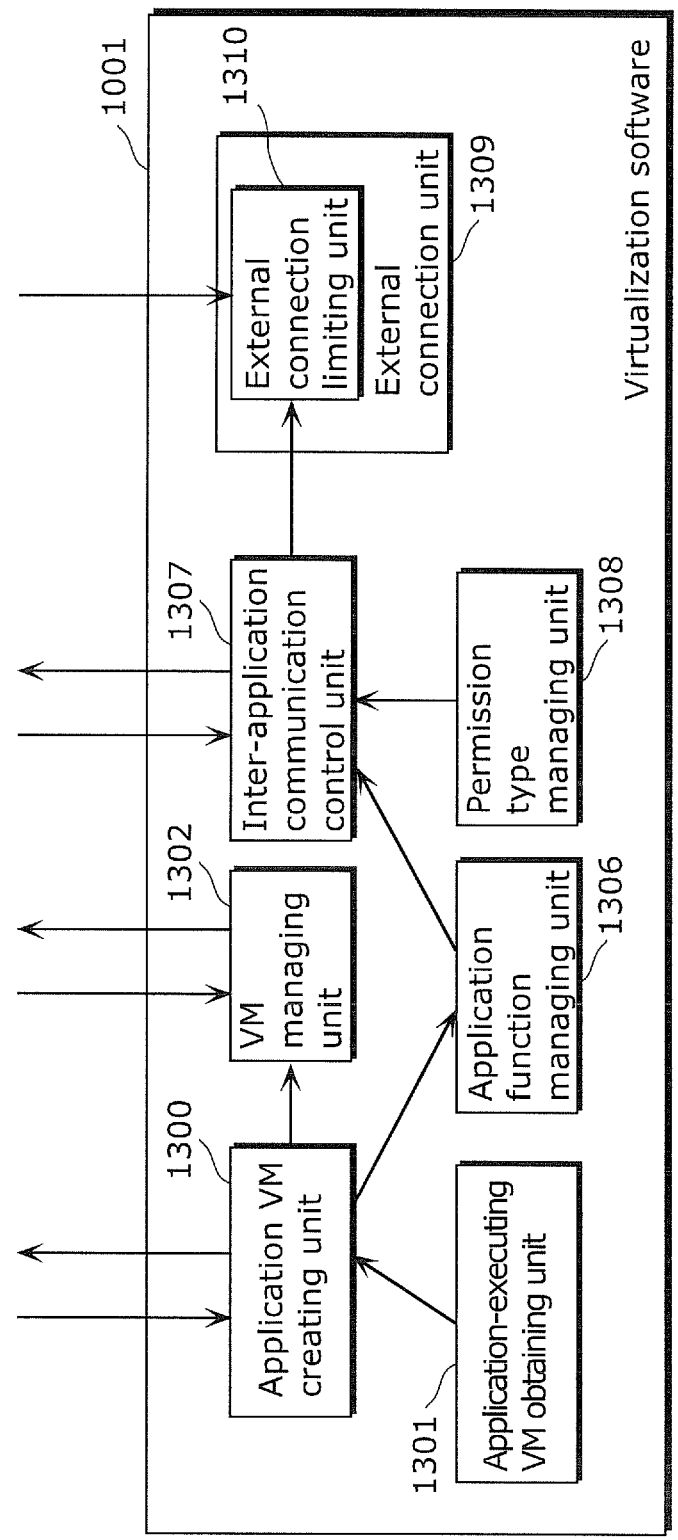
FIG. 12 is a block diagram showing a virtualization software according to Embodiment 1 of the present invention.

FIG. 12 is a block diagram showing the virtualization software 1001 according to Embodiment 1 of the present invention.

In FIG. 12, the virtualization software 1001 includes an application VM creating unit 1300, an application-executing VM obtaining unit 1301, a VM managing unit 1302, an application function managing unit 1306, an inter-application communication control unit 1307, a permission type managing unit 1308, and an external connection unit 1309. The external connection unit 1309 includes an external connection limiting unit 1310.

Upon receiving a request to create a virtual machine (application VM) from a virtual machine operating on the virtualization software 1001, the application VM creating unit 1300 creates the virtual machine (application VM) for executing DL application. Here, the application VM creating unit 1300 creates the virtual machine (application VM) according to the application-executing VM 1241 and a DL application (download package 3120) transmitted from a virtual machine. Moreover, the application VM creating unit 1300 requests the VM managing unit 1302 to manage the created virtual machine. Furthermore, the application VM creating unit 1300 reads a function list 3300 from a configuration file 3202 in the download package 3120 of the DL application transmitted from the virtual machine, and transmits the function list 3300 to the application function managing unit 1306. It is to be noted that details of the VM creation process are described later with reference to a flowchart.

Moreover, here, although the application VM creating unit 1300 creates the virtual machine for executing DL application, based on the application-executing VM 1241 and the DL application transmitted from the virtual machine, the present invention is not limited to this. For example, the application VM creating unit 1300 may download, from the application distribution server 120, a virtual machine including an application, an OS, and a virtual hardware, perform a process of loading the virtual machine, and request the VM managing unit 1302 to perform management. Moreover, the application VM creating unit 1300 may create the virtual machine not at the time of executing the DL application but at the time of downloading the DL application from the application distribution server 120.

The application-executing VM obtaining unit 1301 reads the application-executing VM 1241 stored in the nonvolatile memory device 1240, and provides the application-executing VM 1241 to the application VM creating unit 1300.

FIG. 13 is a diagram showing a structure of the application-executing VM 1241. The application-executing VM 1241 includes header information 1320, a VM main portion 1321, and a verification value 1322. The VM main portion 1321 includes an OS 1325 and a virtual hardware 1326. The header information 1320 includes an address (logical address) for writing an application to be executed, and an address (logical address) of a management structure which manages device drivers. The verification value 1322 is a hash value that is obtained when the VM main portion 1321 is input into a hash function.

It is to be noted that the verification value 1322 may be not behind of the VM main portion 1321 but ahead of the VM main portion 1321, or may be included in the header information 1320. Furthermore, the verification value 1322 may be included not in the application-executing VM 1241 but in one of the nonvolatile memory device 1240 and the nonvolatile secure memory separately from the application-executing VM 1241 and in association with the application-executing VM 1241.

It is to be noted that an algorithm such as MD4, MD5, SHA (Secure Hash Algorithm)-1, and SHA-2 can be used as the hash function. Moreover, the verification value 1322 may be not the hash value but a digital signature, a MAC (Message Authentication Code) value, an error-detecting code value, or an error-correcting code value. For example, CBC-MAC (Cipher Block Chaining Message Authentication Code) and HMAC (Keyed-Hashing for Message Authentication Code) can be used as an algorithm for calculating the MAC value. Moreover, for example, CRC (Cyclic Redundancy Check) and a checksum can be used as an algorithm for calculating the error-detecting code value. Furthermore, for example, Reed-Solomon codes and Turbo codes can be used as an algorithm for calculating the error-correcting code value.

It is to be noted that NPL 3 (Kurosawa, Kaoru and Ogata Wakaha. *"Gendai Ango No Kisosuuri"* Corona Publishing Co., Ltd. 2004) describes in detail hash functions in pages 96 to 105, and Message Authentication Code in pages 30 to 39, and that NPL 2 describes in detail digital signature schemes in pages 171 to 188.

It is to be noted that application-executing VMs 1241 may be stored in the nonvolatile memory device 1240, and the application-executing VM obtaining unit 1301 may switch between the application-executing VMs 1241 to be used, depending on a DL application. Here, the header information 1320 of the switched application-executing VM 1241 may include information which associates the application-executing VM 1241 with the DL application.

Returning to FIG. 12, the following continues to describe the virtualization software 1001.

The VM managing unit 1302 manages virtual machines which are operating on the virtualization software 1001. The VM managing unit 1302 manages a virtual machine which starts at the time of device startup, together with a VM for executing DL application. Moreover, the VM managing unit 1302 uses a virtual machine management table 1350 for the management of the virtual machines.

FIG. 14 is a diagram showing an example of the virtual machine management table 1350. The virtual machine management table 1350 includes a virtual machine ID for identifying a virtual machine, a status of a virtual machine, an address range of a memory used by a virtual machine, and a destination for storing a suspension state at the time of suspending a virtual machine.

Upon receiving notice from the application VM creating unit 1300, the application function managing unit (function managing unit) 1306 manages a function to be used by the DL application which is operating on the virtual machine created by the application VM creating unit 1300. The application function managing unit 1306 uses an application function management table 1380 for the management of the function to be used by the DL application.

FIG. 15 is a diagram showing an example of the application function management table 1350. The application function management table 1380 includes an application ID for identifying an application, a virtual machine ID for identifying a virtual machine on which a DL application is operating, and a function to be used by a DL application. In other words, the application function management table 1380 is a table which is held by the application function managing unit 1306, and shows, for each of the virtual machines, a function to be used by a program to be executed by the virtual machine and an identifier (virtual machine ID) assigned to the virtual machine in association with each other. The application function managing unit 1306 specifies, with reference to the application function management table 1380, a function shown in the application function management table 1380 in association with an identifier assigned to a second virtual machine that is a transmission destination of data from a first virtual machine, and thus specifies the function to be used by a program to be executed by the second virtual machine.

The inter-application communication control unit 1307 controls communication between applications which are operating on different virtual machines. The inter-application communication control unit 1307 sends notice to, via an OS on each of the virtual machines, each virtual machine of a notification destination, thereby sending notice to the applications which are operating on the different virtual machines. The inter-application communication control unit 1307 determines whether or not to permit sending the notice to each of the applications, based on the function to be used by the DL application managed by the application function managing unit 1306 and a permission type management table (list of permitted data types) managed by the permission type managing unit 1308. When the inter-application communication control unit 1307 permits sending the notice, the external connection limiting unit 1307 sends notice of the permission, and transmits, to the external connection limiting unit 1310, a virtual machine ID of a notification destination and a type of transmitted data. To put it differently, when the inter-application communication control unit 1307 permits sending the notice as above, the inter-application communication control unit 1307 obtains data from the first virtual machine among the virtual machines, transmits the data to the second virtual machine among the virtual machines, and transmits, to the external connection unit 1309, transmission completion information indicating that the data is already transmitted to the second virtual machine. The transmission completion information includes an identifier (virtual machine ID of a notification destination) assigned to the second virtual machine to which the data is already transmitted, and a type of the data. It is to be noted that details of the above are described later.

The permission type managing unit (type managing unit) 1308 manages data types for which the inter-application communication control unit 1307 permits the communication. The permission type managing unit 1308 uses a permission type management table 1381 for the management of the data types for which the communication is permitted.

FIG. 16A is a diagram showing an example of the permission type management table 1381. The permission type management table 1381 is a table which shows, for each of functions of applications of communication destinations, which of data types communication is permitted for, and which of data types communication is not permitted for. Stated differently, the permission type management table 1381 is a table which is held by the permission type managing unit 1308, and shows, for each function, a function and a restriction type in association with each other. The permission type management table 1381 is set at the time of system design, and is embedded in the permission type managing unit 1308. It is to be noted that the permission type managing unit 1308 may use another permission type management table. The permission type management table 1381 sets, with reference to the permission type management table 1381, a type of transmission-restricted data depending on the function to be used by the program to be executed by the second virtual machine which is the transmission destination of the data from the first virtual machine. Specifically, the permission type management table 1381 obtains the function which is specified by the application function managing unit 1306 and is to be used by the program to be executed by the second virtual machine, and specifies, with reference to the permission type management table 1381, the restriction type shown in the permission type management table 1381 in association with the obtained function, thereby setting the specified restriction type as the type of the transmission-restricted data.

FIG. 16B is a diagram showing an example of the other permission type management table. The other permission type management table 1382 is a table which shows, for each of applications of notification destinations, which of data types communication is permitted for, and which of data types communication is not permitted for. The table may be set by the user for each application, or may be automatically set depending on a function to be used by a DL application.

It is to be noted that the permission type management table 1381 or 1382 may be set by the user.

The external connection unit 1309 performs a connection process for connecting a software operating on the virtualization software 1001 to the outside of the device. In other words, the external connection unit 1309 connects to a device outside of the device 110 or 111, the information processing device, for the software. The external connection unit 1309 includes the external connection limiting unit 1310. The external connection limiting unit 1310 registers, in a transmitted data type management table 1383, the virtual machine ID transmitted from the inter-application communication control unit 1307 and the type of the transmitted data in association with each other. This updates the transmitted data type management table 1383.

FIG. 17A is a diagram showing an example of the transmitted data type management table 1383. The transmitted data type management table 1383 is a table which is held by the external connection unit 1309, and shows, for each of virtual machines to which data are already transmitted, that is, transmission-completed virtual machines, among the virtual machines, an identifier (virtual machine ID) assigned to the transmission-completed virtual machine and a type of the data transmitted to the transmission-completed virtual machine in association with each other. When the virtual machine operating on the virtualization software 1001 requests the connection to the outside of the device from the external connection limiting unit 1310, the external connection limiting unit 1310 determines whether to permit or restrict the connection depending on the type of the data transmitted to the virtual machine. Here, the type of the data transmitted to the virtual machine is specified with reference to the transmitted data type management table 1383. In other words, the external connection unit 1309 obtains an identifier (virtual machine ID) assigned to a third virtual machine which requests a connection to the outside of the device, and specifies, with reference to the transmitted data type management table 1383, a type shown in the transmitted data type management table 1383 in association with the obtained identifier, thereby specifying the type of data transmitted to the third virtual machine. It is to be noted that details of the process of making the connection to the outside of the device are described later with reference to a flowchart.

It is to be noted that when the inter-application communication control unit 1307 permits sending the notice to the application, the inter-application communication control unit 1307 may transmit, to the external connection limiting unit 1310, permission/restriction information indicating whether a virtual machine on which the application to which the notice is to be sent is operating is permitted to make the connection to the outside of the device. Here, the external connection limiting unit 1310 stores the transmitted permission/restriction information into a connection permission/restriction table.

FIG. 17B is a diagram showing an example of the connection permission/restriction table. The external connection limiting unit 1310 stores, for each virtual machine ID, the transmitted permission/restriction information into a connection permission/restriction table 1384 shown in FIG. 17B. Furthermore, when the connection to the outside of the device is requested from the external connection limiting unit 1310, the external connection limiting unit 1310 determines whether to permit the connection with reference to the connection permission/restriction table 1384 shown in FIG. 17B. The connection permission/restriction table 1384 shows "Yes" in the case of permitting the connection, and "No" in the case of restricting the connection.

It is to be noted that when the inter-application communication control unit 1307 permits sending the notice to the application, the inter-application communication control unit 1307 may restrict inter-application communication by the permitted application. In this case, the inter-application communication control unit 1307 performs the same determination process as the external connection limiting unit 1310.

It is to be noted that the external connection limiting unit 1310 may be in each of the virtual hardwares (1020, 1030) of the respective virtual machines. When the external connection limiting unit 1310 receives an external connection request from the application VMOS (1021, 1031), the external connection limiting unit 1310 determines whether to permit the request.

It is to be noted that when the external connection limiting unit 1310 determines that the connection is restricted, the external connection limiting unit 1310 may restrict not all of the connections but permit a connection to a specific site or restrict only the connection to the specific site. Here, the site to which the connection is permitted or restricted may be pre-set, or may be set by the user.

It is to be noted that whether the external connection is limited when of which types of data are transmitted may be managed using a list (limitation type list), and determined at the time of system design in advance. The list may be embedded in the device or set by the user.

FIG. 17C is a diagram showing an example of the limitation type list. A limitation type list 1385 shows, for each type of data, whether or not an application (virtual machine) to which the data of the type is already transmitted can make the external connection, that is, can connect to the outside of the device via the external connection unit 1309. When the virtual machine operating on the virtualization software 1001 requests the external connection from the external connection unit 1309, the external connection unit 1309 refers to the limitation type list 1385. This enables the external connection unit 1309 to determine, for the type of the data transmitted to the virtual machine, whether or not the external connection is permitted, that is, whether or not the type of the data is a type of connection-restricted data (type indicated by "No" in FIG. 17C). When the external connection unit 1309 determines that the type is the type of the connection-restricted data, the external connection unit 1309 restricts a connection (external connection) between the virtual machine (third virtual machine) which requests the external connection, and the external device.

<Configuration of Inter-Application Communication Control Unit 1307>

Figure 18:
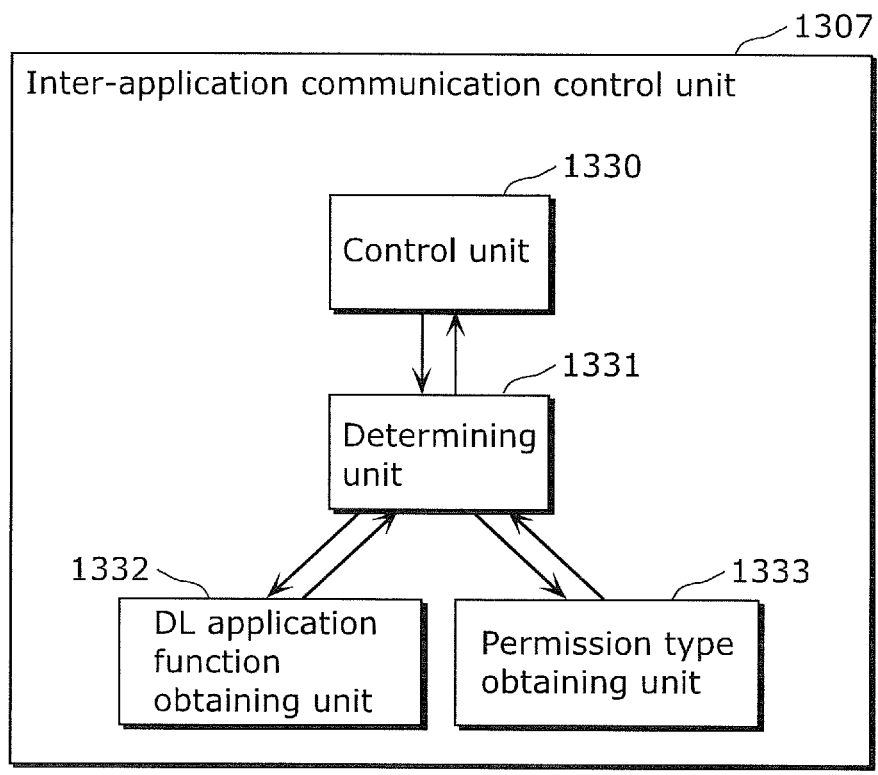
FIG. 18 is a block diagram showing an inter-application communication control unit according to Embodiment 1 of the present invention.

FIG. 18 is a block diagram of the inter-application communication control unit 1307.

In FIG. 18, the inter-application communication control unit 1307 includes a control unit 1330, a determining unit 1331, a DL application function obtaining unit 1332, and a permission type obtaining unit 1333.

Upon receiving a request to send notice to a DL application which is operating on a virtual machine, the control unit 1330 controls inter-application communication. The control unit 1330 receives inter-application communication data 1390 from the DL application operating on the virtual machine, and requests the determining unit 1331 to determine whether or not to transmit the data. The control unit 1330 transmits the inter-application communication data 1390 to the DL application according to the determination result from the determining unit 1331. The transmission to the DL application is performed using virtual interrupt to the virtual machine. In other words, only when the determining unit 1331 determines that a type of data obtained from the first virtual machine is not the type of the transmission-restricted data, the control unit 1330 transmits the data to the second virtual machine, and transmission completion information to the external connection unit 1309. In contrast, when the determining unit 1331 determines that the type of the data obtained from the first virtual machine is the type of the transmission-restricted data, the control unit 1330 restricts the transmission of the data to the second virtual machine, and the transmission of the transmission completion information to the external connection unit 1309.

Figure 19:
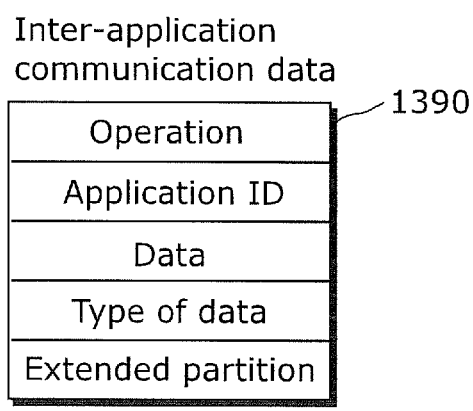
FIG. 19 is a structure diagram showing inter-application communication data according to Embodiment 1 of the present invention.

FIG. 19 is a diagram showing a structure of the inter-application communication data 1390. The control unit 1330 obtains an application ID of a transmission destination and a type of data from the inter-application communication data 1390, sends the application ID of the transmission destination and the type of the data to the determining unit 1331, and requests the determining unit 1331 to make a determination.

The determining unit 1331 receives the application ID of the transmission destination and the type of the data from the control unit 1330, and determines whether or not to permit the transmission of the application ID and the type of the data. To put it differently, the determining unit 1331 determines whether or not the type of the data obtained from the first virtual machine is the type of the transmission-restricted data (type of restriction) set by the permission type managing unit 1308.

Specifically, the determining unit 1331 sends the application ID of the transmission destination to the DL application function obtaining unit 1332, and then obtains a function to be used by an application of the transmission destination and a virtual machine ID of a virtual machine on which the application of the transmission destination operates, from the application function managing unit 1306 via the DL application function obtaining unit 1332. Next, the determining unit 1331 sends, to the permission type managing unit 1308 via the permission type obtaining unit 1333, the function to be used by the application of the transmission destination, and obtains permission/restriction information for types of data. Subsequently, the determining unit 1331 determines whether or not to permit the transmission of the inter-application communication data 1390, based on the type of data received from the control unit 1330 and the permission/restriction information for types of data.

For instance, when the permission/restriction information for types of data indicates "Yes", the determining unit 1331 determines "Permission", and when the permission/restriction information for types of data indicates "No", the determining unit 1331 determines "Restriction". In the case of "Permission", the determining unit 1331 returns, to the control unit 1330, the virtual machine ID of the virtual machine on which the application of the transmission destination operates, together with information indicating "Permission". In the case of "Restriction", the determining unit 1331 returns information indicating "Restriction" to the control unit 1330. It is to be noted that the determining unit 1331 may obtain, from the permission type managing unit 1308 via the permission type obtaining unit 1333, a type of data associated with the permission/restriction information indicating "Yes", that is, a type of data of which transmission has been permitted. In this case, the determining unit 1331 determines whether the type of the data of which transmission has been permitted matches the type of the data received from the control unit 1330. Then, when the determining unit 1331 determines that the types match each other, the control unit 1330 transmits the inter-application communication data 1390 to the application (virtual machine on which the application operates) of the transmission destination, and notifies the external connection unit 1309 of the transmission of the inter-application communication data 1390 to the application of the transmission destination or the virtual machine. On the other hand, when the determining unit 1331 determines that the types do not mach each other, the control unit 1330 does not transmit the inter-application communication data 1390 to the application (virtual machine on which the application operates) of the transmission destination.

The DL application function obtaining unit 1332 receives the application ID from the determining unit 1331. The DL application function obtaining unit 1332 obtains, from the application function management table 1380, a virtual machine ID corresponding to the received application ID and a function to be used, and returns, to the determining unit 1331, the obtained virtual machine ID and function to be used.

The permission type obtaining unit 1333 obtains, from the determining unit 1331, the function to be used by the application. The permission type managing unit 1308 obtains, from the permission type management table 1381, permission/restriction information for types of data corresponding to the received function to be used, and returns the obtained permission/restriction information to the determining unit 1331.

It is to be noted that details of the inter-application communication process are described later with reference to a flowchart.

<Configuration of Universal OS 1011>

Figure 20:
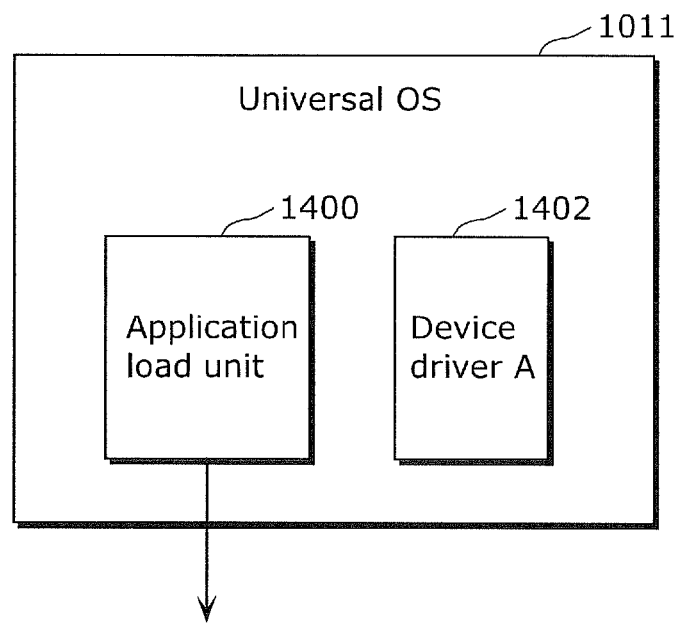
FIG. 20 is a block diagram showing a universal OS according to Embodiment 1 of the present invention.

FIG. 20 is a block diagram showing a universal OS 1011 according to Embodiment 1 of the present invention.

In FIG. 20, the universal OS 1011 includes an application load unit 1400 and a device driver A 1402.

Upon receiving, from the user, a request to start an application, the application load unit 1400 performs an application start process. The application load unit 1400 determines whether or not the application of which start has been requested by the user is a DL application. When the application of which start has been requested by the user is the DL application, the application load unit 1400 requests the virtualization software 1001 to create an application VM. Moreover, when the application of which start has been requested by the user is not the DL application but a normal application, the application load unit 1400 executes the application as an application (application A 1013, application B 1014, and so on) which operates on the universal OS 1011.

The device driver A 1402 manages access to a hardware attached to the device 110 or 111. The device driver A 1402 operates according to a request from an application which operates in and on the universal OS 1011.

<Configuration of Application Load Unit 1400>

Figure 21A:
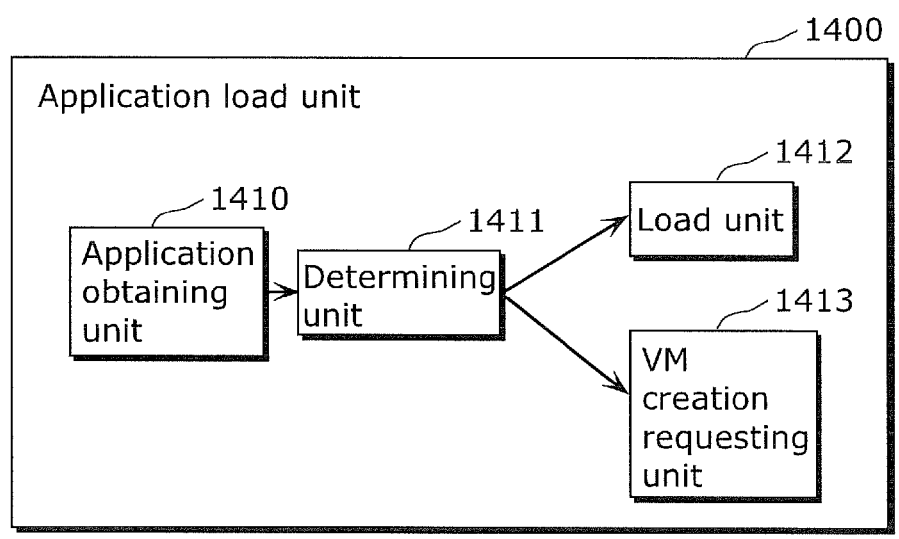
FIG. 21A is a block diagram showing an application load unit according to Embodiment 1 of the present invention.

FIG. 21A is a block diagram showing the application load unit 1400 according to Embodiment 1 of the present invention.

The application load unit 1400 shown in FIG. 21A includes an application obtaining unit 1410, a determining unit 1411, a load unit 1412, and a VM creation requesting unit 1413.

The application obtaining unit 1410 reads, from the non-volatile memory device 1240, an application of which start has been requested by the user.

The determining unit 1411 determines whether or not the application of which start has been requested by the user is a DL application. When the application of which start has been requested by the user is not the DL application, the determining unit 1411 requests the load unit 1412 to load and start the application. When the application of which start has been requested by the user is the DL application, the determining unit 1411 requests the VM creation requesting unit 1413 to start the DL application.

As a method of determining a DL application, for example, the determining unit 1411 determines whether or not an extension assigned to a file name of the application of which start has been requested matches a predetermined extension by comparing the extensions. An extension (predetermined extension) used by the DL application is determined at the time of system design, embedded in the universal OS 1011 in advance, and used for the comparison.

It is to be noted that although the determining unit 1411 uses the extension for the determination of the DL application, the present invention is not limited to this. For instance, the DL application may be stored in a specific directory (folder), and the determining unit 1411 may determine whether or not a name of a directory (name of a folder) of the application of which start has been requested matches a name of the directory in which the DL application is stored, by comparing the names. Moreover, information (identifier) for indicating a DL application may be embedded in header information of the DL application, and the determining unit 1411 may check whether or not the information exists. Furthermore, the determining unit 1411 may determine whether the application is the DL application by using information in the public key certificate 3204 in the download package 3120 of the DL application. Examples of such a determining method include a method of determining whether or not information for identifying a subject or issuer is information indicating a specific enterprise, and a method of checking whether a certificate serial number is composed of a specific character string. Moreover, a DL application managing unit which manages DL applications downloaded from the application distribution server 120 may be provided, and the determining unit 1411 may determine whether the application of which start has been requested is the DL application depending on whether or not the application is an application managed by the DL application managing unit.

The load unit 1412 writes, into the memory 1220, the application read by the application obtaining unit 1410, performs processes necessary for starting the application (e.g. analysis of header, setting of logical address, setting of stack, and setting of entry point), and then executes the application.

Upon receiving the request to start the DL application from the determining unit 1411, the VM creation requesting unit 1413 requests the virtualization software 1001 to create an application VM. Moreover, at the time of the request, the VM creation requesting unit 1413 transmits, to the virtualization software 1001, the DL application to be executed by the application VM.

Figure 21B:
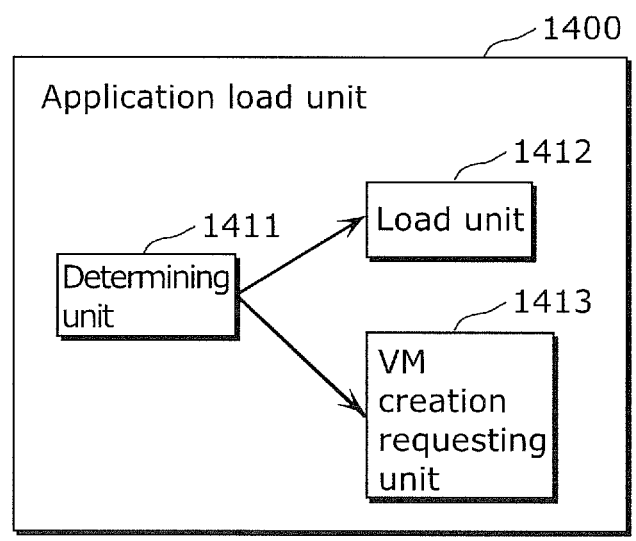
FIG. 21B is a block diagram showing another application load unit according to Embodiment 1 of the present invention.

FIG. 21B is another block diagram of the application load unit 1400.

As shown in FIG. 21B, the application load unit 1400 may include only the determining unit 1411, the load unit 1412, and the VM creation requesting unit 1413. In this case, the function of the application obtaining unit 1410 may be included in the determining unit 1411 or in the application VM creating unit 1300 of the virtualization software 1001 and the load unit 1412.

<Application VM Creation Process>

The universal OS 1011 and the virtualization software 1001 perform an application VM creation process so that the universal OS 1011 and the virtualization software 1001 cause a DL application to operate on an application VMOS in cooperation with each other.

Figure 22:
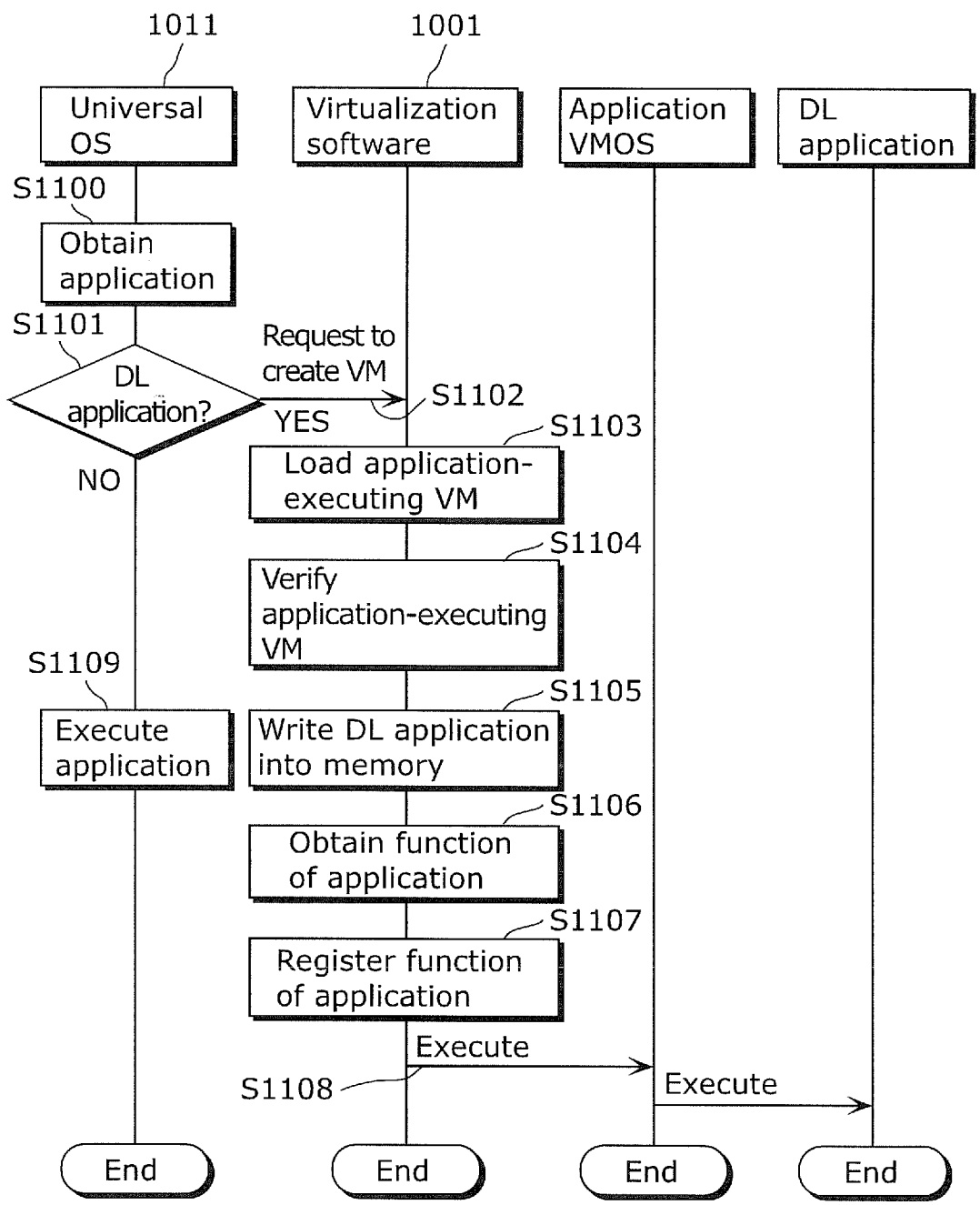
FIG. 22 is a flowchart showing an application VM creation process according to Embodiment 1 of the present invention.

The following describes an application VM creation process at the time when the universal OS 1011 requests the virtualization software 1001 to create an application VM, with reference to a flowchart shown in FIG. 22.

FIG. 22 is the flowchart showing an application VM creation process according to Embodiment 1 of the present invention.

In response to an application execution request from the user, the universal OS 1011 performs an application start process. First, the application load unit 1400 of the universal OS 1011 obtains the application of which execution has been requested, from the nonvolatile memory device 1240 (S1100), and writes the obtained application into the memory 1220.

The application load unit 1400 determines whether or not the obtained application is a DL application (S1101). When the obtained application is the DL application, the application load unit 1400 determines "YES", and when the obtained application is not the DL application, the application load unit 1400 determines "NO".

When the application load unit 1400 determines "YES" in step S1101, the application load unit 1400 requests the virtualization software 1001 to create a VM (application VM) for executing the application of which execution has been requested (S1102). Here, the application load unit 1400 sends, to the virtualization software 1001, the obtained application together with the request.

Upon receiving the application VM creation request, the application VM creating unit 1300 of the virtualization software 1001 loads an application-executing VM (S1103). The load process starts with securing, on the memory 1220, a memory region for the application VM to be created. Then, the application-executing VM 1241 is read from the nonvolatile memory device 1240. Finally, the VM main portion 1321 is written into the secured memory region.

Subsequently, the application VM creating unit 1300 verifies whether the correct VM main portion 1321 is written (S1104). The verification process starts with generating a verification value from the written VM main portion 1321. Next, the application VM creating unit 1300 compares the generated verification value with the verification value 1322 of the application-executing VM 1241, and verifies whether or not the verification values match each other. When the generated verification value does not match the verification value 1322 of the application-executing VM 1241, the application VM creating unit 1300 stops creating the application VM.

It is to be noted that although the application VM creating unit 1300 checks the verification value 1322 after writing the VM main portion 1321 into the memory 1220, the present invention is not limited to this. For instance, the application VM creating unit 1300 may calculate a verification value of the VM main portion 1321 before reading the application-executing VM 1241 from the nonvolatile memory device 1240, and verify whether or not the calculated verification value matches the verification value 1322.

Moreover, when the application VM creating unit 1300 creates virtual machines for respective DL applications, the application VM creating unit 1300 uses the OS 1325 in common. For example, the application VM creating unit 1300 creates, using the OS 1325, both the application VMOSX 1021 of the virtual machine 1003 which executes the DL application X 1022 and the application VMOSY 1031 of the virtual machine 1004 which executes the DL application Y 1032. Specifically, when both the DL application X 1022 and the DL application Y 1032 do not include the DL device driver, the application VMOSX 1021 and the application VMOSY 1031 have the same function. Moreover, when the DL application X 1022 includes the DL device driver, the application VM creating unit creates the application VMOSX 1021 by adding a function of the DL device driver to the OS 1325.

Here, as stated above, the device 110 according to Embodiment 1 of the present invention creates the virtual machines for the respective DL applications, and causes the virtual machines to execute the DL applications. Consequently, an OS is required for each application, which leads to a problem that a capacity of the nonvolatile memory device 1240 for storing the OSs needs to be increased. In response, the application VM creating unit 1300 creates the OS for each application, using the common OS 1325. This makes it only necessary to store only the single OS 1325 in the nonvolatile memory device 1240, and thus it is possible to reduce the capacity of the nonvolatile memory device 1240.

Next, the application VM creating unit 1300 writes, into the memory 1220, the application received from the universal OS 1011 (S1105). Moreover, the application VM creating unit 1300 refers to, as a write address, an address described in the header information 1320 of the application-executing VM 1241. Furthermore, the application VM creating unit 1300 registers, in the VM managing unit 1302, the application VM created from the application-executing VM 1241 and the application, and assigns, to the created application VM, an ID for identifying the application VM (virtual machine).

Next, the application VM creating unit 1300 obtains a function to be used by an application transmitted from the application load unit 1400 (S1106). The function obtaining process involves obtaining the configuration file 3202 from the download package 3120 of the application, and then reading, from the obtained configuration file 3202, the function list 3300 including a function to be used by the application.

The application VM creating unit 1300 extracts, from the read function list 3300, the function to be used by the application, and registers the function in the application function managing unit 1306 (S1107).

Next, the application VM creating unit 1300 requests the VM managing unit 1302 to execute the created application VM. This enables the VM managing unit 1302 to execute the application VM (S1108). In the executed application VM, the application VMOS is executed, and further the DL application is executed.

On the other hand, when the application load unit 1400 determines "NO" in step S1101, the application load unit 1400 registers, in the universal OS 1011, the obtained application as an application which operates on the universal OS 1011, and executes the application (S1109). The universal OS 1011 manages, using a list, the application which operates on the universal OS 1011.

<Inter-Application Communication Process>

The virtualization software 1001 intermediates communication between applications which are operating on different virtual machines. Here, the virtualization software 1001 determines whether or not to permit the communication depending on a function to be used by an application of a transmission destination or a type of data to be transmitted, and controls the communication.

Figure 23:
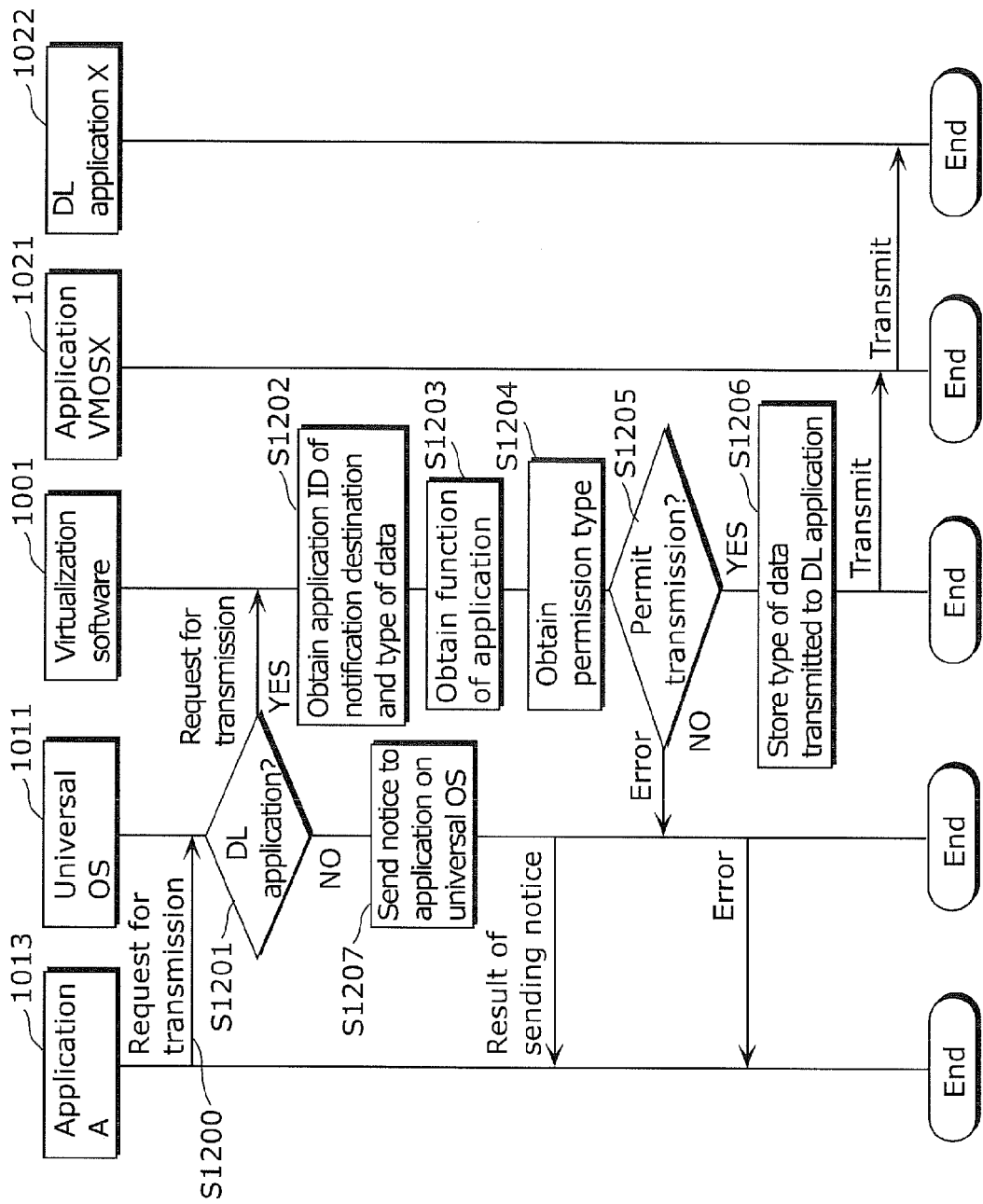
FIG. 23 is a flowchart showing an inter-application communication process according to Embodiment 1 of the present invention.

The following describes a process of transmitting inter-application communication data 1390 about display of picture data, from the application A 1013 which operates on the virtual machine 1002 to the DL application X 1022 which operates on the virtual machine 1003, with reference to a flowchart shown in FIG. 23.

The application A 1013 requests the universal OS 1011 to transmit data to the DL application X 1022 (S1200). At the time of the request, the application A 1013 sends the inter-application communication data 1390 to the universal OS 1011. Here, "Display", an identifier of the DL application X 1022, picture data, and "Picture" are set as an operation, an application ID, data, and a type of data, respectively, in the inter-application communication data.

The universal OS 1011 determines whether the requested transmission of the data is transmission to another application which is operating on the universal OS or transmission to the DL application which is operating on another virtual machine (S1201). Here, when the requested transmission is the transmission to the DL application, the universal OS 1011 determines "YES", and when the requested transmission is the transmission to the other application which is operating on the universal OS 1011, the universal OS 1011 determines "NO". The universal OS determines whether or not the requested transmission is the transmission to the DL application, with reference to a field of the application ID of the inter-application communication data 1390 sent from the application A 1013. The universal OS 1011 determines whether or not the application ID described in the application ID field of the inter-application communication data 1390 is the DL application. The determination method includes determining whether or not the application ID is for the application registered in the universal OS in step S1106 of the application VM creation process. When the application ID described in the application ID field is not registered in a list of applications which operate on the universal OS 1011, the universal OS 1011 determines that the application of the transmission destination is the DL application.

When the universal OS 1011 determines "YES" in step S1201, the universal OS 1011 requests the virtualization software 1001 to transmit the data. Here, the universal OS 1011 transmits, to the virtualization software 1001, the inter-application communication data 1390 transmitted from the application A 1013.

The virtualization software 1001 controls inter-application communication, using the inter-application communication control unit 1307. The inter-application communication control unit 1307 first obtains, from the inter-application communication data 1390, an application ID of a transmission destination and a type of data (S1202).

The inter-application communication control unit 1307 obtains, from the obtained application ID of the transmission destination, a function to be used by an application having the application ID (S1203). Then, the inter-application communication control unit 1307 obtains, from the function to be used by the application which is obtained in step S1203, transmission permission/restriction information for types of data (S1204).

The inter-application communication control unit 1307 determines whether or not the transmission of the inter-application communication data 1390 is permitted, based on the type of the data obtained in step S1202 and the permission/restriction information obtained in step S1204. When the transmission is permitted, the inter-application communication control unit 1307 determines "YES", and when the transmission is not permitted, the inter-application communication control unit 1307 determines "NO".

When the inter-application communication control unit 1307 determines "YES" in step S1205, the inter-application communication control unit 1307 transmits, to the external connection limiting unit 1310, a virtual machine ID of a transmission destination and a type of data to be transmitted. The external connection limiting unit 1310 stores the transmitted virtual machine ID and type of the data (S1206). Lastly, the inter-application communication control unit 1307 transmits the inter-application communication data 1390 to the virtual machine of the transmission destination. As a result, the inter-application communication data 1390 is transmitted from the virtual machine to the application VMOSX 1021, and is subsequently transmitted from the application VMOSX 1021 to the DL application X 1022.

When the inter-application communication control unit 1307 determines "NO" in step S1205, the inter-application communication control unit 1307 sends the universal OS 1011 error notification which indicates that the inter-application communication data 1390 is the inter-application communication data 1390 of which transmission is not permitted. As a result, the error notification is sent from the universal OS 1011 to the application A 1013.

When the universal OS 1011 determines "NO" in step S1201, the universal OS 1011 transmits, to the application on the universal OS 1011, the inter-application communication data 1390 received from the application A 1013 (S1207).

<Process of Making Connection External to Device>

Upon receiving, from a DL application, a request for a connection to the outside of a device, the virtualization software 1001 performs a connection process. Here, it is determined whether or not to permit the connection depending on a type of data previously transmitted to the DL application.

The following describes a process of making a connection to the outside of a device which is requested by the DL application X 1022 that operates on the virtual machine 1003.

Figure 24:
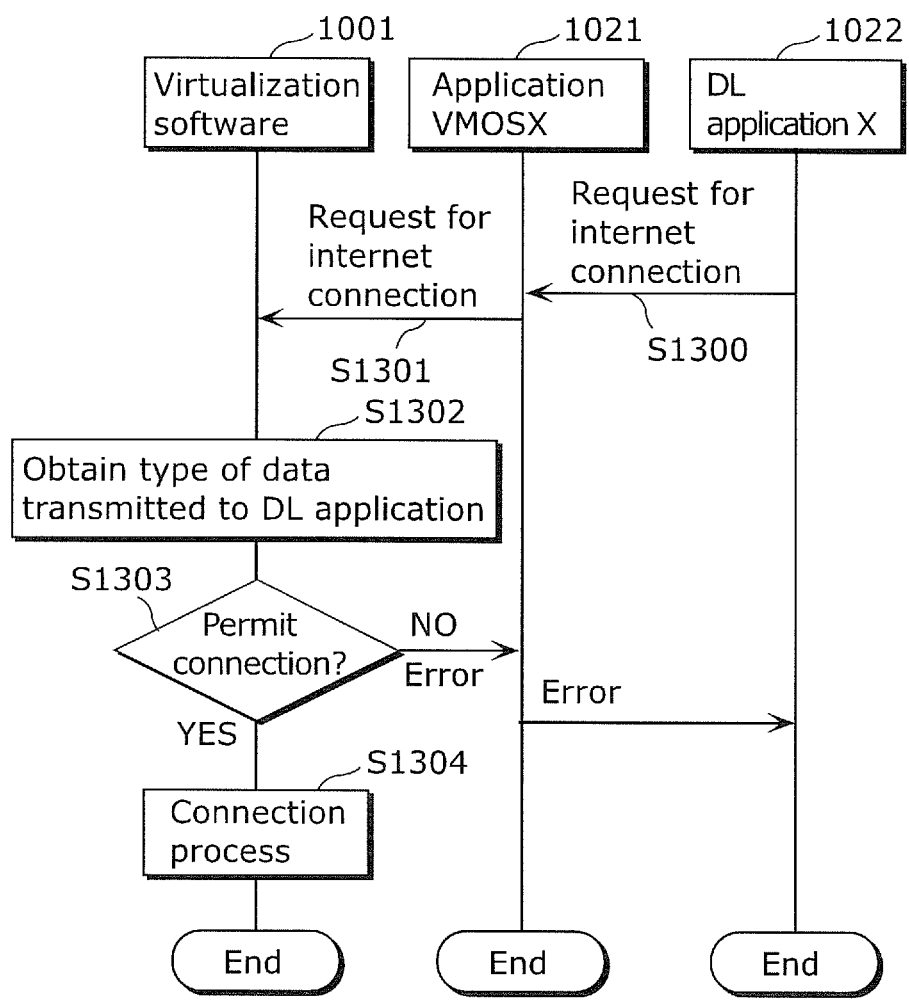
FIG. 24 is a flowchart showing an external connection process according to Embodiment 1 of the present invention.

FIG. 24 is a flowchart showing the process of making a connection to the outside of a device which is requested by the DL application X 1022.

The DL application X 1022 requests an internet connection from the application VMOSX 1021 (S1300). The application VMOSX 1021 requests the internet connection from the virtualization software 1001 (S1301).

The virtualization software 1001 requests the internet connection from the external connection unit 1309. The external connection unit 1309 requests the external connection limiting unit 1310 to determine whether or not to permit the internet connection. The external connection limiting unit 1310 obtains, from the virtual machine ID and the type of the transmitted data stored in step S1206 of the inter-application communication process, a type of transmitted data which corresponds to the virtual machine which has requested the internet connection (S1302).

The external connection limiting unit 1310 determines whether or not to permit the internet connection, based on the type of the transmitted data which is obtained in step S1302 (S1303). When the internet connection is permitted, the external connection limiting unit 1310 determines "YES", and when the internet connection is not permitted, the external connection limiting unit 1310 determines "NO". For instance, when the type of the transmitted data which is obtained in step S1302 is a predetermine type, the external connection limiting unit 1310 determines not to permit the internet connection, and when the type of the transmitted data is not the predetermine type, the external connection limiting unit 1310 determines to permit the internet connection. Specifically, when the type of the data is "Picture", the external connection limiting unit 1310 determines not to permit the internet connection, and when the type of the data is "Email", the external connection limiting unit 1310 judges to permit the internet connection.

When the external connection limiting unit 1310 determines "YES" in step S1303, the external connection limiting unit 1310 performs an internet connection process (S1304). When the external connection limiting unit 1310 determines "NO" in step S1303, the external connection limiting unit 1310 returns an error to the application VMOSX 1021. The application VMOSX 1021 returns the error to the DL application X 1022.

As stated above, in this embodiment, the external connection unit 1309 (i) determines, based on the transmission completion information, whether or not the third virtual machine is the second virtual machine to which the data is already transmitted, when the external connection unit 1309 receives, from the third virtual machine (application VMOSX 1021 or DL application X 1022) among the virtual machines, the request for the connection to the external device, and (ii) permits the connection between the third virtual machine and the external device when the third virtual machine is determined not to be the second virtual machine to which the data is already transmitted. In contrast, the external connection unit 1309 further (i) specifies the type of the data transmitted to the third virtual machine, when the third virtual machine is determined to be the second virtual machine to which the data is already transmitted, (ii) determines whether or not the specified type is the type of the connection-restricted data (e.g. picture), and (iii) restricts the connection between the third virtual machine and the external device when the type is determined to be the type of the connection-restricted data.

It is to be noted that, here, although when the DL application X 1022 requests the internet connection, the external connection limiting unit 1310 determines whether or not to permit the internet connection, the present invention is not limited to this. For example, in the inter-application communication process, the external connection limiting unit 1310 may make the determination when the external connection limiting unit 1310 receives, from the inter-application communication control unit 1307, the virtual machine ID of the transmission destination and the type of the transmitted data. Here, the external connection limiting unit 1310 determines whether or not the virtual machine indicated by the transmitted virtual machine ID is performing an external connection, and determines whether or not to permit the continuous external connection, when the virtual machine is determined to be performing the external connection. The determination method is the same as in step S1303. When the external connection is not permitted in the determination, the external connection limiting unit 1310 terminates the external connection.

Moreover, when the third machine is determined to be the second virtual machine to which the data is already transmitted, the external connection unit 1309 may restrict the connection between the third virtual machine and the external device regardless of, for example, the type of the data.

<Block Diagram of Application-Executing VM Creating Device 1600>

Figure 25:
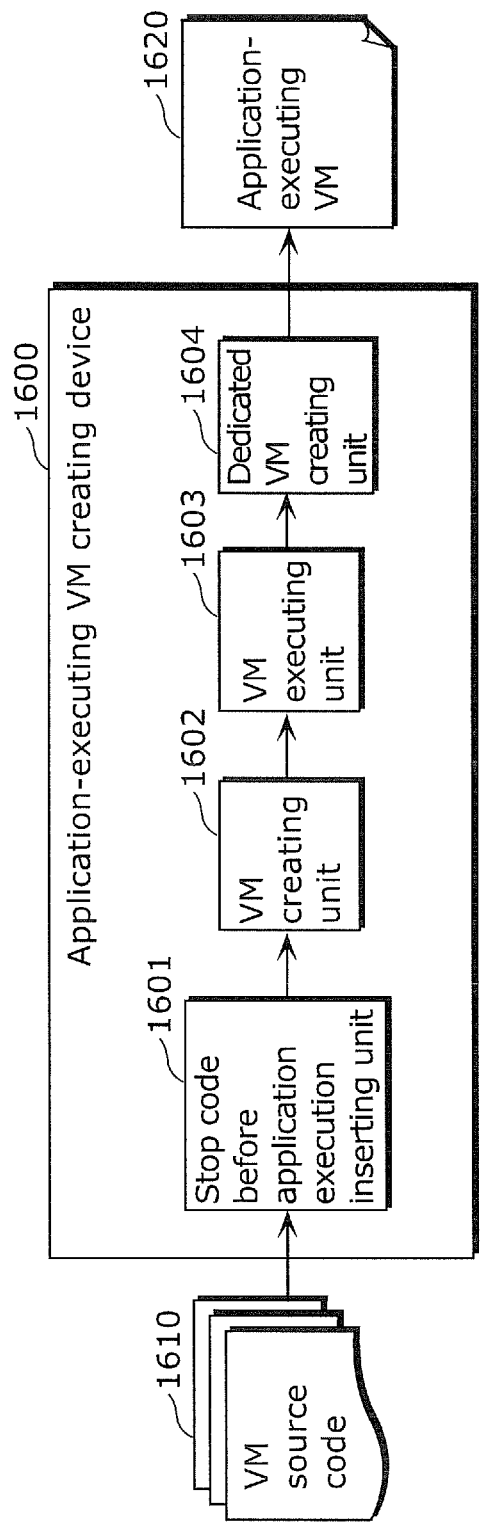
FIG. 25 is a block diagram showing an application-executing VM creating device according to Embodiment 1 of the present invention.

FIG. 25 is a block diagram showing an application-executing VM creating device 1600 according to Embodiment 1 of the present invention.

The application-executing VM creating device 1600 shown in FIG. 25 includes a stop code before application execution inserting unit 1601, a VM creating unit 1602, a VM executing unit 1603, and a dedicated VM creating unit 1604. The application-executing VM creating device 1600 obtains a VM source code 1610, and creates an application-executing VM 1620. The application-executing VM 1620 is stored as the application-executing VM 1241 into the nonvolatile memory device 1240 in the device 110 or 111.

The VM source code 1610 includes a source code of an application VMOS and configuration information of a virtual hardware. A string (stop identifier) (e.g. "PRE_APP_EXEC:") is inserted in the source code of the application VMOS immediately before the application VMOS loads, to the memory 1220, an application which operates on the application VMOS, the string indicating that the application VMOS loads, to the memory 1220, the application.

The stop code before application execution inserting unit 1601 detects the stop identifier inserted in the VM source code 1610, and replaces the stop identifier with a notification command (hypercall or hypervisor call).

The VM creating unit 1602 creates an executable image file of a VM by performing a compilation process and a link process on the VM source code 1610.

The VM executing unit 1603 has a function equivalent to that of the virtualization software 1001, and executes the executable image file of the VM. The VM of which executable image file is executed first performs a process up to the notification command which is embedded instead of the stop identifier, and then performs a notification process to the VM executing unit 1603. Upon receiving the notification, the VM executing unit 1603 terminates the process of the VM.

The dedicated VM creating unit 1604 creates the VM main portion 1321 of the application-executing VM 1620 from a state (data on a memory, a value of a register of a CPU, and so on) of the stopped VM and the executable image file of the VM. Furthermore, the dedicated VM creating unit 1604 generates the header information 1320 and the verification value 1322, and creates the application-executing VM 1620 by combining the header information 1320 and the verification value 1322.

The application-executing VM 1620 includes a VM image file stopped in a state immediately before an application is loaded after the application VMOS starts.

It is to be noted that, here, although the stop identifier is inserted immediately before the application is loaded to the memory 1220, the present invention is not limited to this. For instance, the stop identifier may be inserted immediately after the application is loaded to the memory 1220.

Moreover, here, although the stop code before application execution inserting unit 1601 replaces the stop identifier with the notification command (hypercall), the present invention is not limited to this. For example, the stop code before application execution inserting unit 1601 may automatically detect a position at which the file is stopped, by analyzing the VM source code, and insert the notification command in the detected position. The notification command may be not the hypercall but a breakpoint command or dedicated interrupt command.

As described above, according to Embodiment 1 of the present invention, at the time of performing the inter-application communication process, it is determined whether or not the data is to be transmitted, based on the function of the application to which the data is to be transmitted and the type of the data. Thus, when the application of the transmission destination has the internet connection function, it is possible to prevent transmission of personal content such as data in an address book and pictures.

Moreover, the internet connection by the application is limited depending on the type of the data transmitted to the application. Thus, when the user would like to use a function of the application other than the internet connection function, the user can use the function of the application while preventing the leakage of the personal content via the internet to the outside of the device.

As above, the application distribution system 100 according to Embodiment 1 of the present invention makes it possible to prevent the leakage of information assets caused by the malicious application and the malicious device driver. Consequently, the user can safely use the device.

Embodiment 2

Embodiment 2 of the present invention describes a configuration in which a function of limiting inter-application communication is not included, as opposed to the configuration described in Embodiment 1 of the present invention.

The following describes a configuration of a virtualization software 1001 according to Embodiment 2 of the present invention, an application VM creation process, and an inter-application communication process. It is to be noted that the same reference signs are assigned to the same components and processes as those in Embodiment 1 of the present invention, and descriptions thereof are omitted.

<Configuration of Virtualization Software 1001>

Figure 26A:
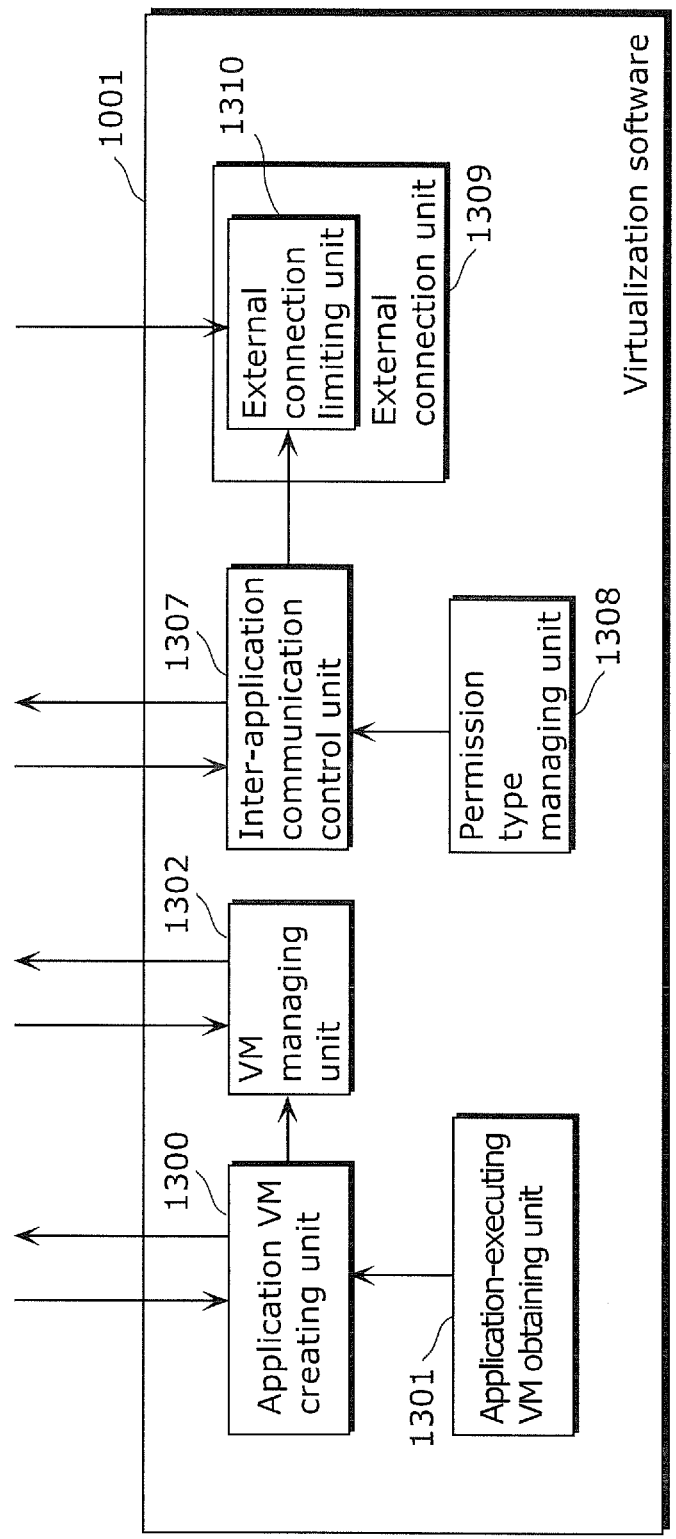
FIG. 26A is a block diagram showing a virtualization software according to Embodiment 2 of the present invention.

FIG. 26A is a software block diagram showing the virtualization software 1001 according to Embodiment 2 of the present invention.

The virtualization software 1001 shown in FIG. 26A includes the application VM creating unit 1300, the application-executing VM obtaining unit 1301, the VM managing unit 1302, the inter-application communication control unit 1307, the permission type managing unit 1308, and the external connection unit 1309.

Upon receiving, from a virtual machine which operates on the virtualization software 1001, a request to create a VM (application VM), the application VM creating unit 1300 creates a VM (application VM) for executing DL application from an application-executing VM and a DL application transmitted from the virtual machine. Moreover, the application VM creating unit 1300 requests the VM managing unit 1302 to manage the created virtual machine. Here, unlike Embodiment 1 of the present invention, the application VM creating unit 1300 neither reads the function list 3300 from the configuration file 3202 in the download package 3120 of the DL application transmitted from the virtual machine nor transmits the function list 3300 to the application function managing unit 1306.

The inter-application communication control unit 1307 controls communication between applications which are operating on different virtual machines. The inter-application communication control unit 1307 sends notice to, via an OS on each of the virtual machines, each virtual machine of a notification destination, thereby sending notice to the applications which are operating on the different virtual machines. Furthermore, the inter-application communication control unit 1307 transmits, to the external connection limiting unit 1310, a virtual machine ID of the transmission destination and a type of transmitted data. Here, unlike Embodiment 1 of the present invention, the inter-application communication control unit 1307 does not determine whether or not to permit sending the notice to the application, based on a function to be used by a DL application managed by the application function managing unit 1306 and a type of permitted data managed by the permission type managing unit 1308. All the data are transmitted to the applications which are operating on the different virtual machines.

It is to be noted that the application-executing VM obtaining unit 1301, the VM managing unit 1302, the permission type managing unit 1308, and the external connection unit 1309 are the same as those in Embodiment 1 of the present invention.

<Application VM Creation Process>

An application VM creation process according to Embodiment 2 of the present invention is largely the same as the application VM creation process (FIG. 22) according to Embodiment 1 of the present invention.

However, the virtualization software 1001 according to Embodiment 2 of the present invention does not manage the function of the DL application, and thus does not perform the process of registering the function of the application in step S1107. The application VM creating unit 1300 creates an application VM from an application-executing VM and a DL application, and requests the VM managing unit 1302 to execute the created application VM after registering the application VM in the VM managing unit 1302. Upon receiving the request, the VM managing unit 1302 executes the application VM (S1108).

<Inter-Application Communication Process>

An inter-application communication process according to Embodiment 2 of the present invention is largely the same as the inter-application communication process (FIG. 23) according to Embodiment 1 of the present invention.

However, the virtualization software 1001 according to Embodiment 2 does not determine whether or not to permit sending the notice to the application, and thus does not perform the process of obtaining the function of the application and the type of permission (S1203 and S1204) and the process of determining whether or not to permit the transmission (S1205). Upon receiving, from the universal OS 1011, a request to send notice, the virtualization software 1001 obtains an application ID of a transmission destination and a type of data (S1202), stores a type of data to be transmitted to a DL application (S1206), and sends the notice to the application VMOSX 1021.

It is to be noted that processes other than the above are the same as those in Embodiment 1 of the present invention.

As explained above, according to Embodiment 2 of the present invention, the internet connection by the application is limited depending on the type of the data transmitted to the application. Thus, when the user would like to use a function of the application other than the internet connection function, the user can use the function of the application while preventing the leakage of the personal contents via the internet to the outside of the device.

The following describes a modification of Embodiment 2 of the present invention.

Figure 26B:
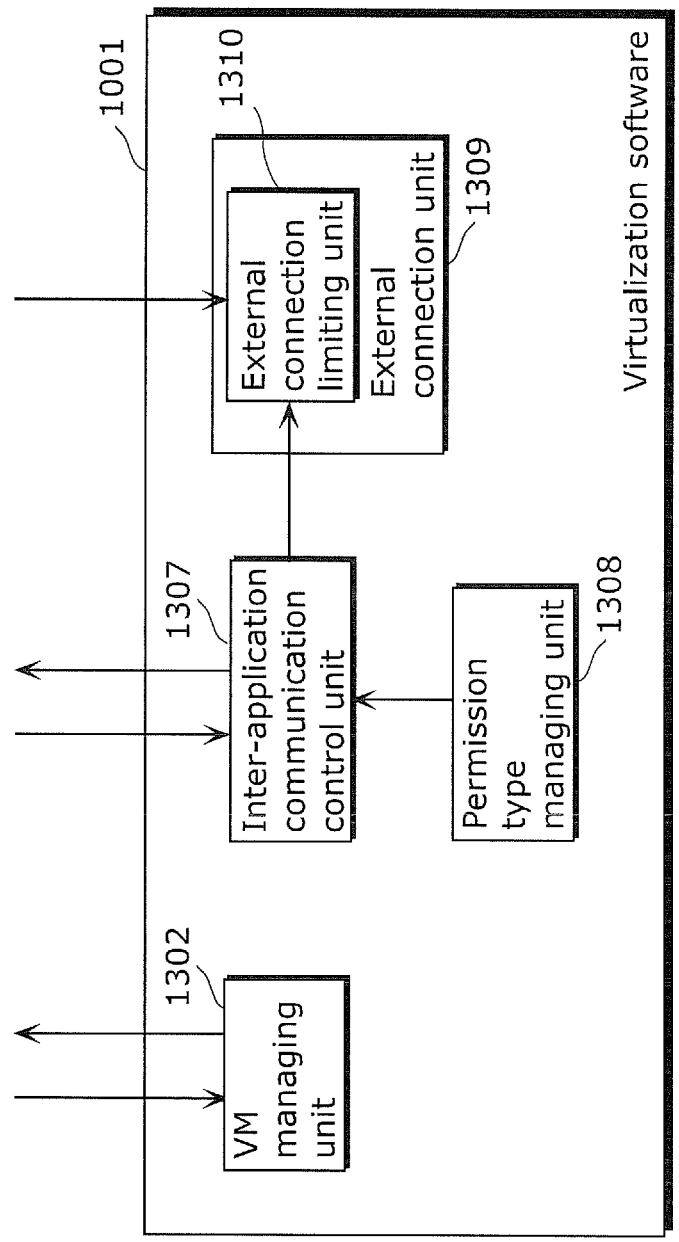
FIG. 26B is a block diagram showing a virtualization software according to Embodiment 2 of the present invention.

FIG. 26B is a block diagram showing the virtualization software 1001 according to the modification of Embodiment 2 of the present invention.

As stated above, the virtualization software 1001 shown in FIG. 26A includes the application VM creating unit 1300 and the application-executing VM obtaining unit 1301, and performs the application VM creation process so that the DL application operates on the application VMOS. However, the present invention is not limited to this. Here, for instance, the virtualization software 1001 according to this modification starts all of necessary virtual machines at the time of system start-up, and does not perform a process of dynamically creating a VM. In this case, as shown in FIG. 26B, the virtualization software 1001 according to this modification does not include the application VM creating unit 1300 and the application-executing VM obtaining unit 1301.

Embodiment 3

Embodiment 3 of the present invention differs from Embodiment 1 of the present invention in a method of determining whether or not to permit inter-application communication or an external connection. In other words, Embodiment 3 is characterized by requesting the universal OS 1011 to determine whether or not to permit the inter-application communication or the external connection.

The following describes a configuration of each of the virtualization software 1001 and the universal OS 1011 according to Embodiment 3 of the present invention, an application VM creation process, and an inter-application communication process. It is to be noted that the same reference signs are assigned to the same components and processes as those in Embodiment 1 of the present invention, and descriptions thereof are omitted.

<Configuration of Virtualization Software 1001>

Figure 27:
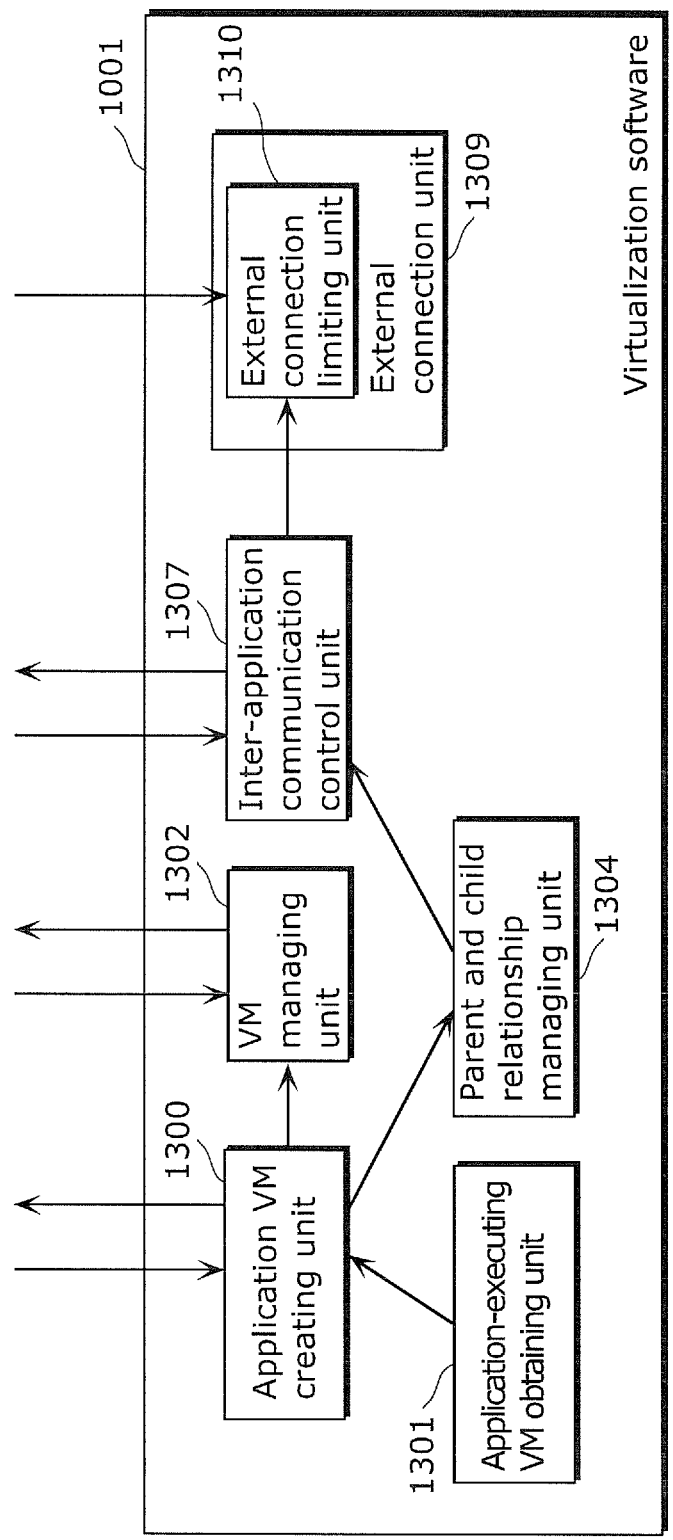
FIG. 27 is a block diagram showing a virtualization software according to Embodiment 3 of the present invention.

FIG. 27 is a block diagram showing the virtualization software 1001 according to Embodiment 3 of the present invention.

The virtualization software 1001 shown in FIG. 27 includes the application VM creating unit 1300, the application-executing VM obtaining unit 1301, the VM managing unit 1302, a parent and child relationship managing unit 1304, the inter-application communication control unit 1307, and the external connection unit 1309.

Upon receiving a request to create a virtual machine (application VM) from a virtual machine operating on the virtualization software 1001, the application VM creating unit 1300 creates the virtual machine (application VM) for executing DL application from the application-executing VM 1241 and a DL application transmitted from the virtual machine. Moreover, the application VM creating unit 1300 requests the VM managing unit 1302 to manage the created virtual machine. Furthermore, the application VM creating unit 1300 registers, in the parent and child relationship managing unit 1304, the virtual machine which has requested the creation of the virtual machine as a "parent", and the created virtual machine as a "child". Here, unlike Embodiment 1 of the present invention, the application VM creating unit 1300 neither reads the function list 3300 from the configuration file 3202 in the download package 3120 of the DL application transmitted from the virtual machine nor transmits the function list 3300 to the application function managing unit 1306.

The parent and child relationship managing unit 1304 manages a parent and child relationship between the virtual machines based on the notice (registration) from the application VM creating unit 1300. The parent and child relationship managing unit 1304 manages the parent and child relationship using a parent and child relationship management table 1360.

Figures 28, 29:
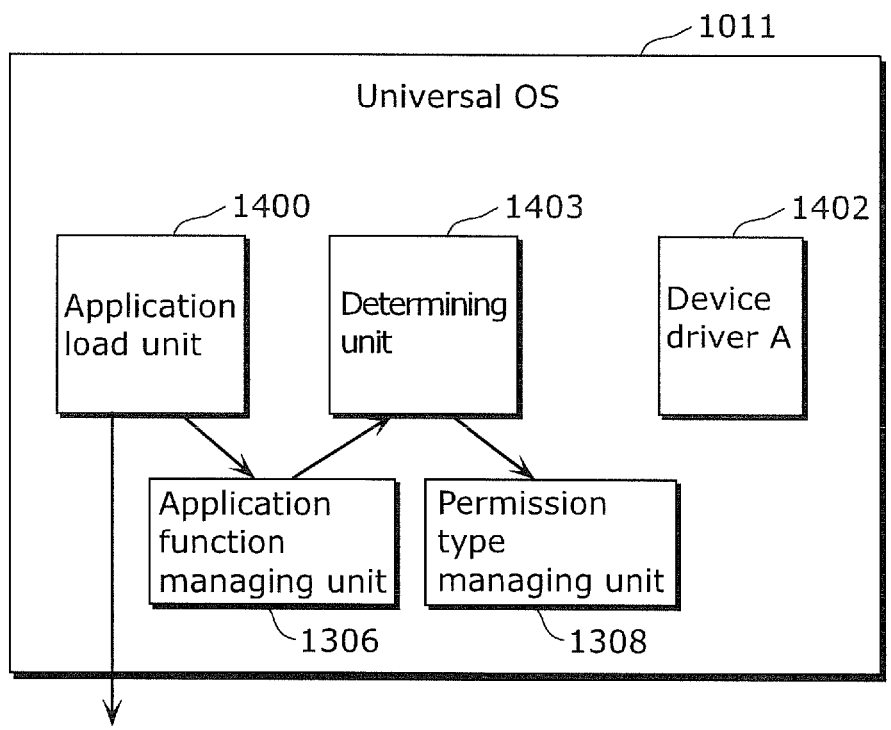
FIG. 28 is a diagram showing a parent and child relationship management table according to Embodiment 3 of the present invention.
FIG. 29 is a block diagram showing a universal OS according to Embodiment 3 of the present invention.

FIG. 28 is a table showing a structure of the parent and child relationship management table 1360. The parent and child relationship management table 1360 includes an ID of the virtual machine registered as the "parent" (parent virtual machine ID) and an ID of the virtual machine registered as the "child" (child virtual machine ID). Moreover, each of the parent virtual machine ID and the child virtual machine ID corresponds to one of the IDs in the virtual machine management table 1350. In other words, the parent and child relationship management table 1360 is a table which is held by the parent and child relationship managing unit 1304, and shows, for each of virtual machines, a child identifier and a parent identifier in association with each other, the child identifier being assigned to one of the virtual machines, and the parent identifier being assigned to another one of virtual machines which has requested the creation of the virtual machine. The parent and child relationship managing unit 1304 specifies, with reference to the parent and child relationship management table 1360, a parent identifier shown by the parent and child relationship management table 1360 in association with a child identifier that is the same as the identifier assigned to the second virtual machine which is the destination of the data from the first virtual machine.

The inter-application communication control unit 1307 controls communication between applications which are operating on different virtual machines. The inter-application communication control unit 1307 sends notice to, via an OS on each of the virtual machines, each virtual machine of a notification destination, thereby sending notice to the applications which are operating on the different virtual machines. Furthermore, the inter-application communication control unit 1307 transmits, to the external connection limiting unit 1310, a virtual machine ID of the notification destination and a type of transmitted data. Here, unlike Embodiment 1 of the present invention, the inter-application communication control unit 1307 does not determine whether or not to permit sending the notice to the application, based on a function to be used by a DL application managed by the application function managing unit 1306 and a type of permitted data managed by the permission type managing unit 1308. The inter-application communication control unit 1307 requests a virtual machine that is a "parent" of a virtual machine which has requested inter-application communication, to make the determination as to whether or not to permit sending the notice to the application. For that purpose, the inter-application communication control unit 1307 obtains, from the parent and child relationship managing unit 1304, information about the virtual machine that is the parent. To put it differently, the inter-application communication control unit 1307 obtains the parent identifier specified by the parent and child relationship managing unit 1304, determines that the virtual machine to which the parent identifier is assigned is the parent virtual machine, and requests the parent virtual machine to make the determination.

In this manner, when the inter-application communication control unit 1307 transmits, to the second virtual machine, the data obtained from the first virtual machine, the inter-application communication control unit 1307 requests the parent virtual machine to determine whether or not to permit the transmission of the data, the parent virtual machine being, among the virtual machines, the virtual machine which has requested the creation of the second virtual machine. Then, only when the parent virtual machine determines to permit the transmission of the data, the inter-application communication control unit 1307 transmits the data to the second virtual machine, and transmission completion information to the external connection unit 1309.

The external connection unit 1309 performs a connection process for connecting a software operating on the virtualization software 1001 to the outside of the device. The external connection unit 1309 includes the external connection limiting unit 1310. The external connection limiting unit 1310 registers, in the transmitted data type management table 1383 shown in FIG. 17A, a virtual machine ID transmitted from the inter-application communication control unit 1307 and a type of transmitted data. When the virtual machine operating on the virtualization software 1001 requests the connection to the outside of the device from the external connection limiting unit 1310, the external connection limiting unit 1310 requests the universal OS 1011 of a virtual machine that is a "parent" of the virtual machine which has made the request, to make the determination as to whether or not to permit the external connection. For that purpose, the external connection limiting unit 1310 obtains, from the parent and child relationship managing unit 1304, information about the virtual machine that is the "parent", and transmits, to the "parent" virtual machine, a type of data transmitted to the virtual machine which has requested the connection to the outside of the device. When the universal OS 1011 of the "parent" virtual machine determines whether or not to permit the external connection, the external connection limiting unit 1310 performs or restricts the external connection according to the determination result.

It is to be noted that the application-executing VM obtaining unit 1301 and the VM managing unit 1302 are the same as those in Embodiment 1 of the present invention.

<Configuration of Universal OS 1011>

FIG. 29 is a block diagram showing the universal OS 1011 according to Embodiment 3 of the present invention.

In FIG. 29, the universal OS 1011 includes the application load unit 1400, the device driver A 1402, the determining unit 1403, the application function managing unit 1306, and the permission type managing unit 1308.

Upon receiving, from the user, a request to start an application, the application load unit 1400 performs an application start process. The application load unit 1400 determines whether or not the application of which start has been requested by the user is a DL application. When the application of which start has been requested by the user is the DL application, the application load unit 1400 requests the virtualization software 1001 to create an application VM. Furthermore, the application load unit 1400 reads the function list 3300 from the configuration file 3202 in the download package 3120 of the DL application, and transmits the function list 3300 to the application function managing unit 1306. Moreover, when the application of which start has been requested by the user is not the DL application but a normal application, the application load unit 1400 executes the application as the application which operates on the universal OS 1011.

Upon receiving the function list 3300 from the application load unit 1400, the application function managing unit 1306 manages a function to be used by the DL application. The application function managing unit 1306 uses the application function management table 1380 shown in FIG. 15 for the management of the function to be used by the DL application. The application function management table 1380 includes the application ID for identifying the application, the virtual machine ID for identifying the virtual machine on which the DL application is operating, and the function to be used by the DL application.

The determining unit 1403 receives an application ID of a transmission destination and a type of data from the control unit 1307, and determines whether or not to permit transmission of the application ID and the type of the data. The determining unit 1403 first sends the application ID of the transmission destination to the application function managing unit 1306, and obtains a function to be used by an application of the transmission destination, and a virtual machine ID of a virtual machine on which the application of the transmission destination operates. Next, the determining unit 1403 sends, to the permission type managing unit 1308, the function to be used by the application of the transmission destination, and obtains permission/restriction information for types of data. Subsequently, the determining unit 1403 determines whether or not to permit transmission of the inter-application communication data 1390, based on the type of the data received from the inter-application communication control unit 1307 and the permission/restriction information for types of data. When the permission/restriction information for types of data indicates "Yes", the determining unit 1403 determines "Permission", and when the permission/restriction information for types of data indicates "No", the determining unit 1403 determines "Restriction".

Moreover, when the external connection limiting unit 1310 requests the determining unit 1403 to determine whether or not to permit the external connection and the determining unit 1403 receives a type of data from the external connection limiting unit 1310, the determining unit 1403 determines whether to permit or restrict the external connection according to the transmitted type of the data, and transmits the determination result to the external connection limiting unit 1310.

It is to be noted that the device driver A 1402 and the permission type managing unit 1308 are the same as those in Embodiment 1 of the present invention.

<Application VM Creation Process>

Figure 30:
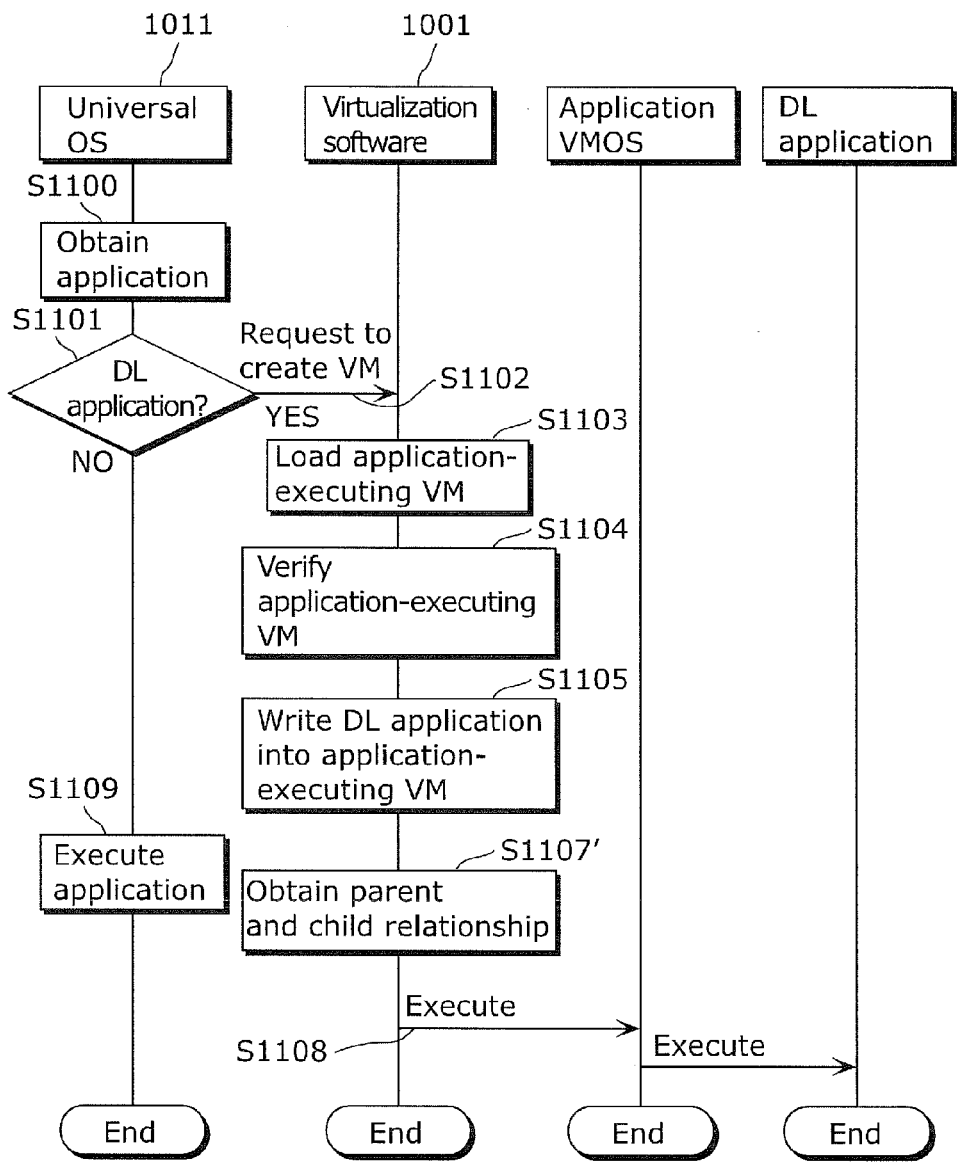
FIG. 30 is a flowchart showing an application VM creation process according to Embodiment 3 of the present invention.

FIG. 30 is a flowchart showing an application VM creation process according to Embodiment 3 of the present invention. The application VM creation process according to Embodiment 3 of the present invention is largely the same as the application VM creation process (FIG. 22) according to Embodiment 1 of the present invention.

However, the virtualization software 1001 according to Embodiment 3 of the present invention does not manage the function of the DL application, and thus does not perform the process of registering the function of the application in steps S1106 and S1107 shown in FIG. 22. Instead, the application VM creating unit 1300 performs a process of registering, in the parent and child relationship managing unit 1304, a virtual machine which has requested creation of a virtual machine as a "parent", and the created virtual machine as a "child" (S1107').

It is to be noted that the processes (S1100 to S1105, S1108, and S1109) other than the above are the same as those in Embodiment 1 of the present invention.

It is to be noted that although the present invention has been described based on the embodiments, it goes without saying that the present invention is not limited to the embodiments. The present invention includes the following cases.

(1) Although the DL application according to the embodiments is downloaded from the application distribution server 120, the present invention is not limited to this. For instance, the DL application may be an application installed from the apparatus for development 130 or a PC connected through a USB, or may be originally installed at the time of shipment of the device 110.

(2) The software configuration of each of the devices 110 and 111 according to the embodiments may not include the virtual machine 1005 including the RTOS 1041, or may include virtual machines 1002 each of which includes the universal OS 1011 or virtual machines 1005 each of which includes the RTOS 1041. Moreover, the software configuration may include a virtual machine which does not include an OS, or a virtual machine on which an application involving an OS function operates. Furthermore, these virtual machines may request the virtualization software 1001 to create an application VM. Here, each of the virtual machines is registered as a separate parent in the parent and child relationship managing unit 1304.

(3) Although the application VM according to the embodiments is loaded to the memory 1220 at the time of executing the DL application, and is executed, the present invention is not limited to this. For example, the virtualization software 1001 may load only the application-executing VM 1241 to the memory 1220 prior to the execution of the DL application, and load the DL application to the memory 1220 at the time of executing the DL application. Moreover, the virtualization software 1001 may load the application-executing VM 1241 and the DL application to the memory 1220 before the execution of the DL application.

(4) Although the application-executing VM 1241 according to the embodiments includes the VM image file stopped, using the application-executing VM creating device 1600, in a state immediately before the application is loaded after the application VMOS starts, the present invention is not limited to this. For instance, the application-executing VM 1241 may include a VM image file in a state before the application VMOS starts. Here, the application VMOS may start for each DL application, or an application VM stopped in a state immediately before the application is loaded may be started in advance, the application VM stopped in the state immediately before the application is loaded may be copied at the time of executing the DL application, and the copied application VM may execute the DL application.

(5) Although the embodiments have described the configuration of each of the devices 110 and 111 which are an information processing device according to an implementation of the present invention with reference to FIGS. 2, 3, and 12, the information processing device according to the implementation of the present invention does not need to include all of the components shown in these figures.

Figure 31:
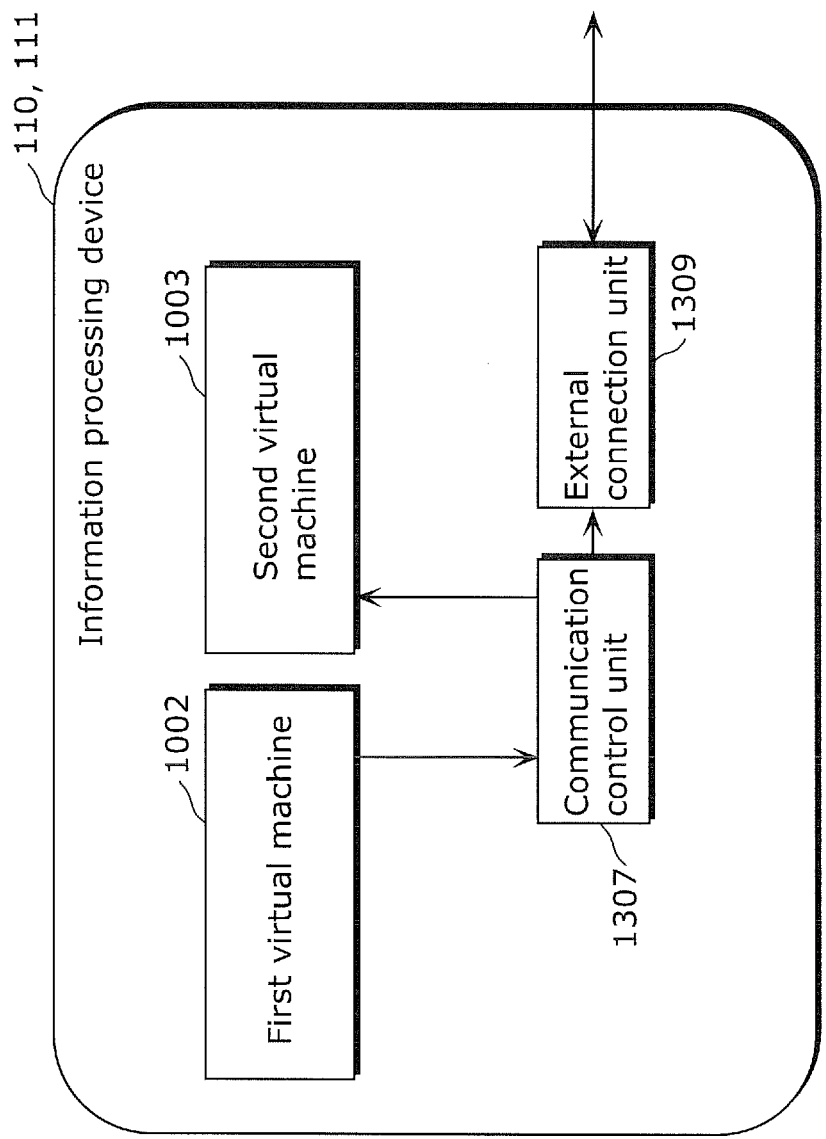
FIG. 31 is a block diagram showing a configuration of an information processing device according to an implementation of the present invention.
Figure 32:
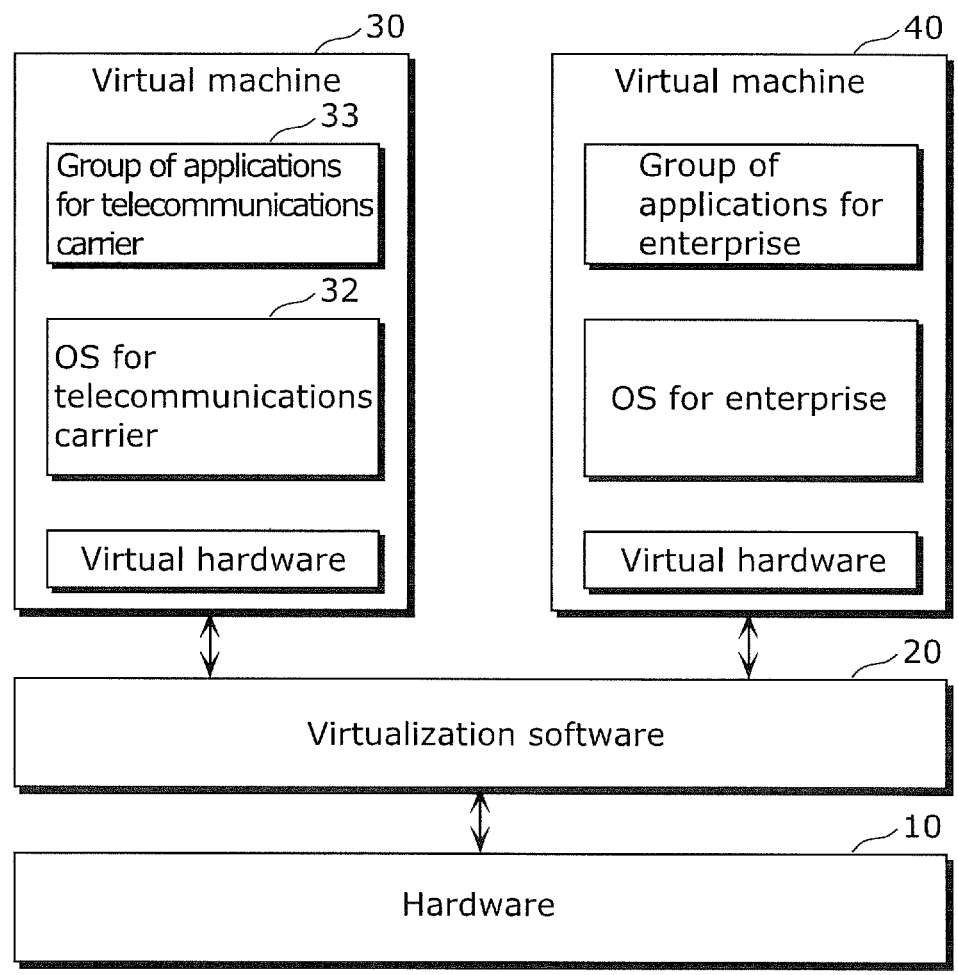
FIG. 32 is a schematic diagram showing a cellular phone for which execution environments are separated using a conventional virtualization technique.

FIG. 31 is a block diagram showing a configuration of the information processing device according to the implementation of the present invention.

Each of information processing devices 110 and 111 includes the first virtual machine 1002, the second virtual machine 1003, a communication control unit 1307 that is the inter-application communication control unit 1307, and the external connection unit 1309. In other words, the information processing devices 110 and 111 according to the implementation of the present invention are information processing devices 110 and 111 having a plurality of virtual machines, each of the information processing devices 110 and 111 including: an external connection unit 1309 which connects to a device outside of each of the information processing devices 110 and 111; and a communication control unit 1307 which obtains data from a first virtual machine 1002 among the virtual machines, transmits the data to a second virtual machine 1003 among the virtual machines, and transmits, to the external connection unit 1309, transmission completion information indicating that the data is already transmitted to the second virtual machine 1003. When the external connection unit 1309 receives, from a third virtual machine among the virtual machines, a request for a connection to the external device, the external connection unit 1309 determines whether or not the third virtual machine is the second virtual machine 1003 to which the data is already transmitted, based on the transmission completion information. When the external connection unit 1309 determines that the third virtual machine is not the second virtual machine to which the data is already transmitted, the external connection unit 1309 permits the connection between the third virtual machine and the external device.

With this configuration, execution environments of programs (applications or device drivers) executed by the virtual machines can be separated by the virtual machines, and the data is transmitted from the first virtual machine 1002 to the second virtual machine 1003. Thus, it is possible to cause the virtual machines to cooperate with each other. Stated differently, it is possible to achieve data transfer (application link) between an application or device driver that is a program to be executed by the first virtual machine 1002 and an application or device driver that is a program to be executed by the second virtual machine 1003. Furthermore, when the information processing device according to the implementation of the present invention determines that the third virtual machine is not the second virtual machine 1003 to which the data is already transmitted, the information processing device permits the connection between the third virtual machine and the external device. Consequently, even if a program to be executed by the third virtual machine is a malicious application or malicious device driver, data is not transmitted to the program from another virtual machine (program to be executed by the other virtual machine), and thus it is possible to prevent the leakage of the data even when the third virtual machine communicates with the external device.

To put it differently, even when this configuration, even when an attack application (malicious application or malicious device driver) developed by a malicious attacker obtains information held by another application, it is possible to prevent the information from leaking to the outside of the information processing devices 110 and 111. As a result, even if the user cannot determine whether or not a DL application is the malicious application, the user can use the DL application without worrying about the information leakage. In addition, it is possible to achieve the application link between the different virtual machines.

As above, even when the information processing devices 110 and 111 according to the implementation of the present invention do not include, for example, the secure software execution environment 1100, the other virtual machines 1004 and 1005, the application VM creating unit 1300, the application-executing VM obtaining unit 1301, the VM managing unit 1302, the application function managing unit 1306, and the permission type managing unit 1308 which are shown in, for example, FIGS. 2, 3, 12, the information processing devices 110 and 111 can produce the advantageous effects of the present invention. Moreover, even when data is always transmitted without determining whether or not the transmission of the data between the virtual machines is permitted, the information processing devices 110 and 111 can produce the advantageous effects of the present invention.

(6) In the embodiments, when there are functions to be used by the program to be executed by a virtual machine of a data transmission destination (second virtual machine), the permission type managing unit 1308 refers to the permission type management table 1381 for each of the functions to be used by the program. When any one of the functions is associated with a restriction type (type indicated by "No" in FIG. 16A) though the other functions are not associated with the restriction type, the permission type managing unit 1308 returns, for the restriction type, restriction information to the determining unit 1331. For instance, when the program uses the internet connection and Bluetooth as functions, the permission type managing unit 1308 refers to the permission type management table 1381 based on each of the internet connection and Bluetooth. When the internet connection is associated with an email as a restriction type although Bluetooth is not associated with the email as the restriction type, the permission type managing unit 1308 returns, for the email (restriction type), the restriction information to the determining unit 1331.

(7) Each of the above devices is specifically a computer system including, for example, a micro processing unit, a ROM, a RAM, a hard disk unit, a display unit, a keyboard, a mouse. A computer program is stored in the RAM or the hard disk unit. The micro processing unit operates according to the computer program, so that each device performs a corresponding function. Here, in order to perform a predetermined function, the computer program is programmed by combining instruction codes each indicating an instruction for a computer.

(8) Part or all of the elements included in each device may be included in one system LSI (Large Scale Integration). The system LSI is a super-multifunctional LSI manufactured by integrating the elements on one chip, and is specifically a computer system including, for example, a micro processing unit, a ROM, and a RAM. A computer program is stored in the RAM. The micro processing unit operates according to the computer program, so that the system LSI performs its function.

Moreover, the elements included in each device may be integrated into individual chips, or into a single chip so as to include par or all of the elements.

Here, although an integrated circuit is referred to as the system LSI, the integrated circuit may also be referred to as an IC, an LSI, a super LSI, or an ultra LSI. In addition, a circuit integration method is not limited to the LSI, and may be realized with a dedicated circuit or a general-purpose processor. FPGA (Field Programmable Gate Array) that can be programmed after the manufacture of the LSI or a reconfigurable processor which can reconfigure connection or setting of circuit cells in the LSI may be used.

Additionally, if a new circuit integration technique is introduced in place of the LSI along with development in semiconductor technology or other derivative technology, it is obvious that the technique may be used for integrating functional blocks. There is a possibility of applying, for example, biotechnology.

(9) Part or all of the elements included in each device may be included in an IC card detachable to each device or in a stand-alone module. The IC card or the module is a computer system including, for example, a micro processing unit, a ROM, and a RAM. The IC card or the module may include the super-multifunctional LSI. The micro processing unit operates according to a computer program, so that the IC card or the module performs its function. The IC card or the module may have tamper-resistance.

(10) The present invention may be any of the above methods. Moreover, the present invention may be a computer program which causes a computer to perform these methods or a digital signal included in the computer program.

Furthermore, in the present invention, the computer program or the digital signal may be recorded on a computer-readable recording medium such as a flexible disk, a hard disk, a CD-ROM, an MO, a DVD, a DVD-ROM, a DVD-RAM, a BD (Blu-ray Disc), and a semiconductor memory. In addition, the present invention may be the digital signal recorded on these recording media.

Moreover, in the present invention, the computer program or the digital signal may be transmitted via an electric telecommunication line, a wireless or wired telecommunication line, a network represented by, for example, the Internet or data broadcasting.

Furthermore, the present invention may be a computer system including a micro processing unit and a memory. The computer program may be stored in the memory, and the micro processing unit may operate according to the computer program.

Moreover, by recording the program or the digital signal on the recording medium to transfer it, or by transferring the program or the digital signal via, for example, the network, the present invention may be implemented on another independent computer system.

(11) The embodiments and the modifications may be combined.

The present invention can be applied to information processing devices which use downloaded applications and device drivers. In addition, the present invention is useful to, for example, cellular phones and home appliances such as televisions which include the information processing devices.

REFERENCE SIGNS LIST

10 Hardware
20, 1001 Virtualization software
30, 40, 70, 80, 1002, 1003, 1004, 1005 Virtual machine
1325 OS
100 Application distribution system
110, 111 Device
120 Application distribution server
130 Apparatus for development
1000 Normal software execution environment (normal environment)
1010, 1020, 1030, 1040 Virtual hardware
1011 Universal OS
1012 Download control application
1013 Application A
1014 Application B
1021 Application VMOSX
1022, 1242 DL application X
1031 Application VMOSY
1032, 1243 DL application Y
1041 RTOS
1042 Conversation software
1100 Secure software execution environment (secure environment)
1101 Secure OS
1102 Secure boot unit
1200 System LSI
1201 CPU
1202 IPL (Initial Program Loader)
1203 Execution environment switching unit
1204 Internal secure memory
1220 Memory
1240 Nonvolatile memory device
1241, 1620 Application-executing VM
1300 Application VM creating unit
1301 Application-executing VM obtaining unit
1302 VM managing unit
1306 Application function managing unit
1307 Inter-application communication control unit
1308 Permission type managing unit
1309 External connection unit
1310 External connection limiting unit
1320 Header information
1321 VM main portion
1322 Verification value
1326 Virtual hardware
1330 Control unit
1331 Determining unit
1332 DL application function obtaining unit
1333 Permission type obtaining unit
1350 Virtual machine management table
1360 Parent and child relationship management table
1380 Application function management table
1381, 1382 Permission type management table
1383 Transmitted data type management table
1384 Connection permission/restriction table
1390 Inter-application communication data
1400 Application load unit
1402 Device driver A
1403 Determining unit
1410 Application obtaining unit
1411 Determining unit
1412 Load unit
1413 VM creation requesting unit
1600 Application-executing VM creating device
1601 Stop code before application execution inserting unit
1602 VM creating unit
1603 VM executing unit
1604 Dedicated VM creating unit
1610 VM source code
2000 Application holding unit
2001 Application reception processing unit
2002 Application transmission processing unit
3000 Package generating unit
3001 Configuration file generating unit
3002 Key pair holding unit
3003 Key pair generating unit
3004 Debug processing unit
3005 Upload processing unit
3100 Compiler
3101 Linker
3102 Package generation tool
3110 Source code
3120 Download package
3130 Private key
3131, 3204 Public key certificate
3132, 3202 Configuration file
3200 Application
3201 Device driver
3203 Application signature list

The invention claimed is:

1. An information processing device having a plurality of virtual machines, the information processing device comprising:
a non-transitory memory device storing a program; and
a hardware processor configured to execute the program and to cause the information processing device to operate as the following units stored in the memory device:
an external connection unit configured to connect to an external device outside of the information processing device,
a communication control unit configured to obtain from a first virtual machine among the virtual machines, personal content that is at least one of a private photo, a video, an e-mail, position information, or data of a telephone directory, transmit the personal content to a second virtual machine among the virtual machines, and transmit, to the external connection unit, transmission completion information indicating that the personal content is already transmitted to the second virtual machine; and
a function managing unit configured to hold a function management table which shows, for each of the virtual machines, a function to be used by a program to be executed by the virtual machine and an identifier assigned to the virtual machine in association with each other,
wherein the function managing unit is configured to specify the function to be used by the program to be executed by the second virtual machine, by specifying, with reference to the function management table, a function which is shown by the function management table in association with the identifier assigned to the second virtual machine, and
the type managing unit is configured to obtain the function specified by the function managing unit, and
wherein the external connection unit is configured to (i) determine, based on the transmission completion information, whether or not a third virtual machine among the virtual machines is the second virtual machine which is included in the information processing device and to which the personal content is already transmitted from the first virtual machine included in the information processing device, when the external connection unit receives, from the third virtual machine, a request for a connection to the external device, and (ii) permit a connection between the third virtual machine included in the information processing device and the external device outside of the information processing device, when the external connection unit determines that the third virtual machine is not the second virtual machine which is included in the information processing device and to which the personal content is already transmitted.

2. The information processing device according to claim 1, wherein the external connection unit is configured to restrict the connection between the third virtual machine and the external device, when the external connection unit determines that the third virtual machine is the second virtual machine to which the personal content is already transmitted.

3. The information processing device according to claim 1, wherein the external connection unit is further configured to (i) specify a type of personal content transmitted to the third virtual machine, when the external connection unit determines that the third virtual machine is the second virtual machine to which the personal content is already transmitted, (ii) determine whether or not the type is a connection-restricted type, and (iii) restrict the connection between the third virtual machine and the external device, when the external connection unit determines that the type is the connection-restricted type.

4. The information processing device according to claim 3, wherein the communication control unit is configured to transmit, to the external connection unit, the transmission completion information including (i) an identifier assigned to the second virtual machine to which the personal content is already transmitted and (ii) a type of the personal content transmitted to the second virtual machine, and the external connection unit is further configured to (i) hold a transmission type management table which shows, for each of transmission-completed virtual machines, an identifier assigned to the transmission-completed virtual machine and a type of personal content transmitted to the transmission-completed virtual machine in association with each other, the transmission-completed virtual machines being, among the virtual machines, virtual machines to each of which personal content is already transmitted, and (ii) update the transmission type management table so that the transmission type management table shows the identifier and the type in association with each other, the identifier and the type being included in the transmission completion information transmitted by the communication control unit.

5. The information processing device according to claim 4, wherein the external connection unit is configured to obtain an identifier assigned to the third virtual machine, and specify the type of the personal content transmitted to the third virtual machine, by specifying, with reference to the transmission type management table, a type shown by the transmission type management table in association with the obtained identifier.

6. The information processing device according to claim 1, wherein the communication control unit includes:

a determining unit configured to determine whether or not a type of the personal content obtained from the first virtual machine is a transmission-restricted type; and a control unit configured to transmit the personal content obtained from the first virtual machine to the second virtual machine, and the transmission completion information to the external connection unit, only when the determining unit determines that the type of the personal content obtained from the first virtual machine is not the transmission-restricted type.

7. The information processing device according to claim 6, wherein the control unit is configured to restrict the transmission of the personal content to the second virtual machine and the transmission of the transmission completion information to the external connection unit, when the determining unit determines that the type of the personal content obtained from the first virtual machine is the transmission-restricted type.

8. The information processing device according to claim 7, further comprising a type managing unit stored in the memory device and configured to set the transmission-restricted type, according to a function to be used by a program to be executed by the second virtual machine, wherein the determining unit is configured to determine whether or not the type of the personal content obtained from the first virtual machine is the transmission-restricted type set by the type managing unit.

9. The information processing device according to claim 8, wherein the type managing unit is further configured to (i) hold a permission type management table which shows, for each of functions, a restriction type in association with the function, (ii) obtain the function to be used by the program to be executed by the second virtual machine, (iii) specify, with reference to the permission type management table, the restriction type shown by the permission type management table in association with the obtained function, and (iv) set the specified restriction type as the transmission-restricted type.

10. The information processing device according to claim 1, wherein the communication control unit is further configured to (i) request a parent virtual machine to determine whether or not to permit the transmission of the personal content, when the communication control unit transmits the personal content obtained from the first virtual machine to the second virtual machine, the parent virtual machine being, among the virtual machines, a virtual machine which requests creation of the second virtual machine, and (ii) transmit the personal content to the second virtual machine, and the transmission completion information to the external connection unit, only when the parent virtual machine determines to permit the transmission of the personal content.

11. The information processing device according to claim 10, further comprising a parent and child relationship managing unit configured to hold a parent and child relationship management table which shows, for each of the virtual machines, a child identifier assigned to the virtual machine and a parent identifier assigned to another virtual machine which requests creation of the virtual machine, wherein the parent and child relationship managing unit is configured to specify, with reference to the parent and child relationship management table, one of the parent identifiers shown by the parent and child relationship management table in association with a corresponding one of the child identifiers that is the same as the identifier assigned to the second virtual machine, and the communication control unit is configured to determine that one of the virtual machines to which the parent identifier specified by the parent and child relationship managing unit is assigned is the parent virtual machine, and request the parent virtual machine to make the determination.

12. An information processing method performed by an information processing device which has a plurality of virtual machines and processes information, the information processing method comprising:
  connecting to an external device outside of the information processing device, the connecting being performed by an external connection unit included in the information processing device;
  obtaining from a first virtual machine among the virtual machines, personal content that is at least one of a private photo, a video, an e-mail, position information, or data of a telephone directory, transmitting the personal content to a second virtual machine among the virtual machines, and transmitting, to the external connection unit, transmission completion information indicating that the personal content is already transmitted to the second virtual machine; and
  storing a function management table which shows, for each of the virtual machines, a function to be used by a program to be executed by the virtual machine and an identifier assigned to the virtual machine in association with each other,
  wherein the function to be used by the program to be executed by the second virtual machine is specified, by specifying, with reference to the function management table, a function which is shown by the function management table in association with the identifier assigned to the second virtual machine, and
  the function specified is obtained in the obtaining step,
  wherein in the connecting, it is determined, based on the transmission completion information, whether or not a third virtual machine among the virtual machines is the second virtual machine which is included in the information processing device and to which the personal content is already transmitted from the first virtual machine included in the information processing device, when a request for a connection to the external device is received from the third virtual machine, and a connection between the third virtual machine included in the information processing device and the external device outside of the information processing device is permitted when it is determined that the third virtual machine is not the second virtual machine which is included in the information processing device and to which the personal content is already transmitted.

13. A non-transitory computer-readable recording medium storing a program for an information processing device which has a plurality of virtual machines and processes information, the program, when loaded into a computer included in the information processing device, causing the computer to execute steps comprising:
  connecting to an external device outside of the information processing device, the connecting being performed by an external connection unit included in the information processing device;
  obtaining from a first virtual machine among the virtual machines, personal content that is at least one of a private photo, a video, an e-mail, position information, or data of a telephone directory, transmitting the personal content to a second virtual machine among the virtual machines, and transmitting, to the external connection unit, transmission completion information indicating that the personal content is already transmitted to the second virtual machine; and
  storing a function management table which shows, for each of the virtual machines, a function to be used by a program to be executed by the virtual machine and an identifier assigned to the virtual machine in association with each other,
  wherein the function to be used by the program to be executed by the second virtual machine is specified, by specifying, with reference to the function management table, a function which is shown by the function management table in association with the identifier assigned to the second virtual machine, and
  the function specified is obtained in the obtaining step,
  wherein in the connecting, it is determined, based on the transmission completion information, whether or not a third virtual machine among the virtual machines is the second virtual machine which is included in the information processing device and to which the personal content is already transmitted from the first virtual machine included in the information processing device, when a request for a connection to the external device is received from the third virtual machine, and a connection between the third virtual machine included in the information processing device and the external device outside of the information processing device is permitted when it is determined that the third virtual machine is not the second virtual machine which is included in the information processing device and to which the personal content is already transmitted.

14. A program distribution system which distributes a program via a network, the program distribution system comprising:
  a distribution server which distributes at least one program; and
  the information processing device according to claim 1,
  wherein the information processing device includes an obtaining unit configured to obtain the at least one program distributed from the distribution server,
  the communication control unit is configured to transmit the personal content obtained from the first virtual machine, to a first program to be executed by the second virtual machine among the at least one program, and
  the external connection unit is configured to receive a request for a connection to the external device from a second program to be executed by the third virtual machine among the at least one program.

15. A semiconductor integrated circuit having a plurality of virtual machines, the semiconductor integrated circuit comprising:
  an external connection circuit configured to connect to an external device outside of the semiconductor integrated circuit;
  a communication control circuit configured to obtain from a first virtual machine among the virtual machines, personal content that is at least one of a private photo, a video, an e-mail, position information, or data of a telephone directory, transmit the personal content to a second virtual machine among the virtual machines, and transmit, to the external connection circuit, transmission completion information indicating that the personal content is already transmitted to the second virtual machine; and
  a function managing unit configured to hold a function management table which shows, for each of the virtual machines, a function to be used by a program to be executed by the virtual machine and an identifier assigned to the virtual machine in association with each other, wherein the function managing unit is configured to specify the function to be used by the program to be executed by the second virtual machine, by specifying, with reference to the function management table, a function which is shown by the function management table in association with the identifier assigned to the second virtual machine, and the type managing unit is configured to obtain the function specified by the function managing unit, and wherein the external connection circuit is configured to (i) determine, based on the transmission completion information, whether or not a third virtual machine among the virtual machines is the second virtual machine which is included in the information processing device and to which the personal content is already transmitted from the first virtual machine included in the information processing device, when the external connection circuit receives, from the third virtual machine, a request for a connection to the external device, and (ii) permit a connection between the third virtual machine included in the information processing device and the external device outside of the information processing device, when the external connection circuit determines that the third virtual machine is not the second virtual machine which is included in the information processing device and to which the personal content is already transmitted.

* * * * *